United States Patent [19]
Rottenburg et al.

[11] Patent Number: 5,729,890
[45] Date of Patent: Mar. 24, 1998

[54] METHOD OF MAKING AN ARCUATE SCAN TAPE DRIVE

[75] Inventors: John M. Rottenburg, Duhlin; Joseph Lin, Cupertino; Robert H. Peirce, Del Mar; Richard Milo, Lake Forest; Michael Andrews, Soguel, all of Calif.

[73] Assignee: Seagate Technology, Inc., Scotts Valley, Calif.

[21] Appl. No.: 686,306

[22] Filed: Jul. 25, 1996

Related U.S. Application Data

[63] Continuation of Ser. No. 113,996, Aug. 30, 1993, Pat. No. 5,585,978.
[51] Int. Cl.$^6$ .................................................. G11B 5/42
[52] U.S. Cl. ................................ 29/603.18; 29/603.06
[58] Field of Search ............................ 29/603.04–603.06, 29/603.16, 603.17, 603.18; 360/85, 107, 109, 130.22

[56] References Cited

U.S. PATENT DOCUMENTS

| | | |
|---|---|---|
| 2,743,318 | 4/1956 | De Forest . |
| 2,743,319 | 4/1956 | Thompson et al. . |
| 2,750,449 | 6/1956 | Thompson et al. . |
| 2,772,328 | 11/1956 | Lyon . |
| 2,973,410 | 2/1961 | Hoshino et al. . |
| 3,079,469 | 2/1963 | Backers et al. . |
| 3,317,680 | 5/1967 | Porter . |
| 4,112,472 | 9/1978 | Hauke et al. . |
| 4,636,886 | 1/1987 | Schwarz . |
| 4,731,681 | 3/1988 | Ogata . |

FOREIGN PATENT DOCUMENTS

| | | |
|---|---|---|
| 58-35758 | 3/1983 | Japan . |
| WO 93/26005 | 6/1993 | WIPO . |

*Primary Examiner*—Carl E. Hall
*Attorney, Agent, or Firm*—Lowe, Price, LeBlanc & Becker

[57] ABSTRACT

An arcuate scan tape drive for transferring data to and from a data tape, including a base with four side walls and a cover, which base and cover together have a 3½ inch form factor. In one embodiment, the head carrier assembly is provided at an oblique angle with respect to the data tape and the front surface is conically shaped. Thus, during rotation of the head carrier assembly, the recording heads are proximate to the data tape during read or write operations, but are spaced away from the data tape at other times. The head carrier assembly includes an inside-out spin motor for rotating the head carrier assembly and a pivot motor structure at the rear of the head carrier assembly for pivoting the head carrier assembly in a plane perpendicular to the longitudinal direction of advancement of the tape. The spin motor and pivoting structures receive servo signals from a controller so as to continuously adjust the position of the core elements with respect to the data tape so as to align the core elements with the arcuately-shaped data tracks.

4 Claims, 25 Drawing Sheets

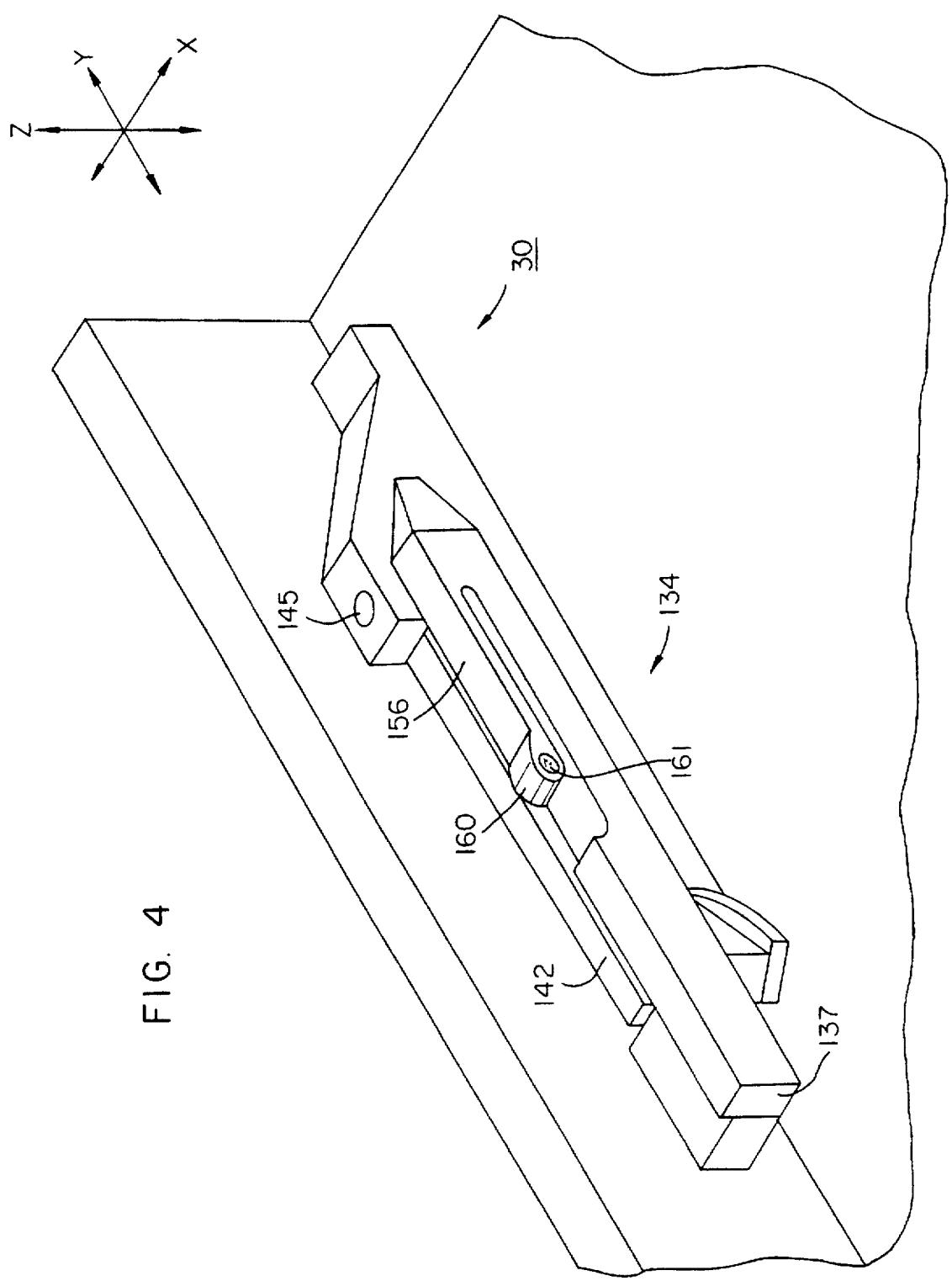

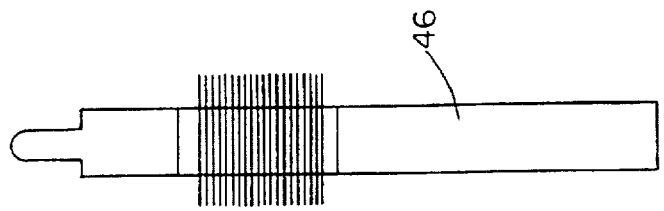
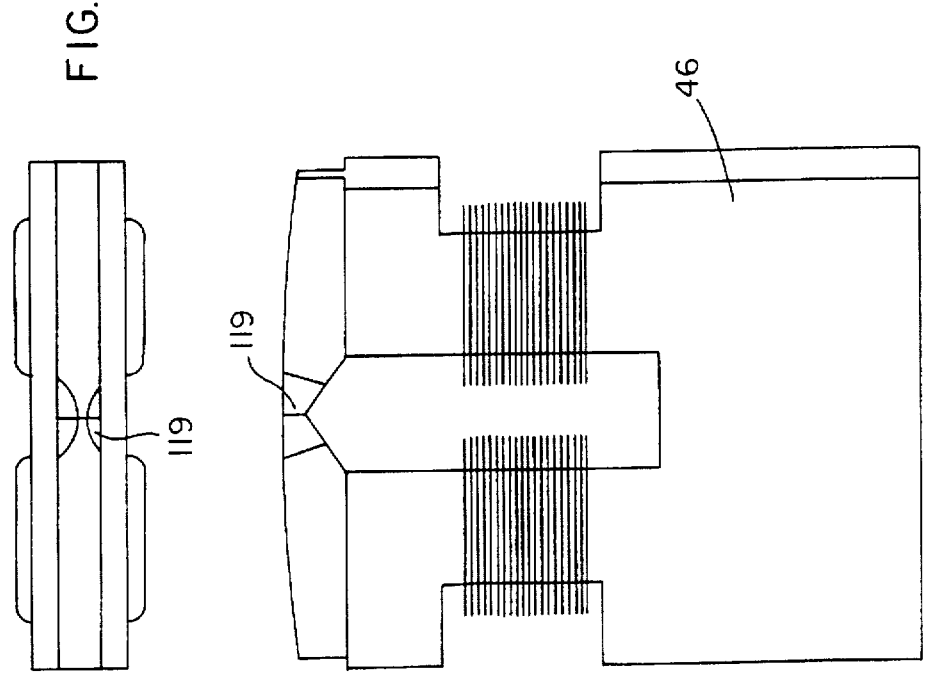

METHOD OF MAKING AN ARCUATE SCAN TAPE DRIVE

This application is a continuation of application Ser. No. 08/113,996 filed Aug. 30, 1993, now U.S. Pat. No. 5,585,978.

BACKGROUND OF THE INVENTION

1. Field of the Invention

The present invention relates to a data storage device and, in particular, to an arcuate scan tape drive for storing approximately ten or more gigabytes of data on a conventional minicartridge tape.

2. Description of the Related Art

Tape drives are widely used in data processing systems for applications including primary data storage, archival data storage, journaling, and most significantly, as a back-up data storage device to the system's hard drive. Conventional tape drives are designed to transfer data to and from a length of magnetically encoded tape, typically one-quarter inch in width, which tape is transferred between a supply reel and a take-up reel. Currently, most 3½ inch form factor tape drives utilize a so called "minicartridge" cassette tape for data storage. This type of cartridge is generally described in American National Standard ANSI 3.55-1977. The cartridge measures approximately 9/16" in height by approximately 2⅜" in width by approximately 3 3/16" in length and carries a data tape approximately ¼" in width.

While several tape drive designs exist for recording and playing back a data tape, the two most widely used drive technologies up to now have been stationary head tape drives for longitudinal recording and rotary head tape drives for diagonal or "helical" recording.

In longitudinal recording, a tape drive includes a plurality of adjacent stationary heads which are provided to lie across the width of a data tape. As the tape advances past the recording area, each head transfers data to or from a respective track of a plurality of parallel, longitudinally oriented data tracks. A drawback to longitudinal recording is that it is difficult to obtain a high track density across the width of the data tape. Typically in longitudinal recording the read head is slightly narrower than the written data track so that the read head may be located off center of a data track and still lie within the data track. As the number of tracks across the width of the tape increases, the tracks and the read elements become narrower. When there are many narrow tracks, it becomes extremely difficult to find and read the correct track. Consequently, the areal density of a data tape recorded by longitudinal recording must be kept relatively low in comparison to other data storage techniques. While a few longitudinal recording head designs exist having increased areal density capabilities, such systems require complex positioning mechanisms and are relatively expensive.

In comparison to longitudinal recording, rotary head helical recording provides a relatively large areal density. In helical recording, one or more heads are provided around the circumferential surface of a rotating cylindrical drum. An advancing data tape encounters the rotating drum such that the longitudinal direction of the tape is angled with respect to the plane in which a read/write head on the drum rotates. Thus, as the tape advances and the drum rotates, the drum will record a series of parallel diagonal data tracks on the tape.

With helical recording, as in most data storage technologies, it is necessary to maintain a close physical contact between the read/write head and the storage media. A disadvantage to rotary recording technology is that existing head/tape engagement mechanisms are relatively cumbersome and complex, as well as quite slow to engage and disengage the tape. Consequently, such mechanisms significantly add to the size and expense of the tape drive. Additionally, conventional engagement mechanisms in rotary tape drives involve wrapping the advancing tape around at least a portion of the rotating drum and maintaining a high pressure contact therebetween. This results in a high rate of wear to both the heads and the tape. A still further disadvantage to helical recording is that the recording tape is subject to stretching and shrinking due to wear, humidity and temperature, which stretching or shrinking will distort the diagonal data tracks. Such distortion makes it difficult to accurately align the read/write heads with the data tracks.

Presently in the tape drive industry, as in other data storage technologies, there is a movement toward smaller drive dimensions while at the same time increasing data storage capacity. Existing longitudinal and helical recording technologies have proven inadequate in meeting these demands.

U.S. patent application Ser. No. 07/898,926, filed Jun. 12, 1992, by J. Lemke, which Application was PCT filed on Jun. 10, 1993 and assigned PCT Ser. No. PCT/US93/05655, discloses a relatively compact tape drive for recording and playing back approximately 10 gigabytes on a conventional minicartridge. This storage capacity is higher than that previously obtained with either longitudinal or helical recording. The Lemke application discloses a tape drive including a plurality of heads placed on the front circular face of a rotating drum, with the axis of rotation of the rotating drum being perpendicular to and intersecting with the longitudinal axis of the advancing tape. As the tape advances from the right to the left and the drum rotates in a counterclockwise direction, the heads trace arcuately-shaped data tracks substantially transverse to the longitudinal axis of the tape. Arcuate scan recording has been known for some time, but has been disfavored due to at least the lack of effective servoing schemes for accurately maintaining alignment of the heads with the arcuate data tracks.

The head mechanism in the Lemke application includes at least one read, one write and one servoing head mounted on the front face of the rotating drum. The drive further includes a servoing scheme to adjust head/track alignment in two ways in response to servo feedback signals. The first way is to adjust the speed at which the tape advances past the recording area. The second servo adjustment is accomplished by pivotally mounting the head assembly along its length so that the axis of rotation of the head assembly may be tilted upward or downward at the forwardmost face of the drum in response to the servo signals. In this way, the axis of rotation at the front face may be adjusted to align with the centerline of the tape, which tends to stray slightly upward or downward as the tape advances.

The Lemke application discloses two alternative methods of accomplishing the tilting of the head assembly. In one embodiment, coils of electrically conductive windings are situated both above and below a magnetic positioning piece at the end of the pivoting head assembly opposite the rotary head drum. Each coil sets up a magnetic field upon receipt of an electrical current generated in response to a servo signal. The currents in the top and bottom windings exert opposite repulsive forces on the positioning piece. The Application discloses that the electrical currents in the two coils will balance the positioning piece at the proper tilt angle, depending on which coil exerts a greater repulsive force and to what degree it is greater. In an alternative embodiment, there is disclosed a conventional torque motor which exerts a torque on a pin located on the tilt axis of the head assembly, midway along the length of the head assembly. This pin is attached to the head assembly and the tilt angle of the head assembly is determined by the intensity and direction of the current supplied to the torque motor.

In arcuate scan tape drives, such as those disclosed in the Lemke and instant applications, it is imperative that the servo schemes and servo structures be able to quickly and accurately correct the position of the heads to properly align with the arcuate data tracks. A disadvantage to tape drives such as disclosed in the Lemke application is that the structures described above for accomplishing the tilting of the head assembly are unable to correct the tilt position of the head assembly with sufficient quickness or accuracy for proper functioning of the tape drive. This imposes a limit on the amount of data that can be recorded on a given length of tape.

Another reason arcuate scan recording has traditionally been disfavored is because of the relatively poor head/tape interface and tribology which may be achieved with conventional arcuate scan recording systems. As opposed to rigid recording media such as magnetic disks, magnetic recording tape is flexible and, absent some control mechanism, the tape will not maintain a fixed, constant and repeatable position as it travels past the read/write heads in the recording area. A fixed, constant and repeatable head/tape interface is imperative to accurate alignment of the read/write heads with the data tracks, as well as to obtaining a high storage density on the data tape.

A conventional method of obtaining a fixed, constant and repeatable head/tape engagement has been to apply a tension longitudinally to the data tape in the tape cassette. This results in satisfactory tape rigidity across a portion of the width of the tape nearest the centerline of the tape. However, this method is not able to apply a uniform tension across the width of the tape, and as such, the edges of the tape remain relatively slack. Thus, conventional arcuate scan recording systems have not been able to obtain a close head/tape interface near the edges of the tape. While increasing the tension in the data tape will result in a higher degree of rigidity and greater head/tape contact area across the width of the tape, this also results in excessive wear and damage to the head and/or tape in a relatively short period of time.

SUMMARY OF THE INVENTION

It is therefore an object of the present invention to provide a tape drive having a compact design, capable of storing approximately 10 gigabytes or more of data on a conventional data tape.

It is another object of the present invention to provide a mechanism within the tape drive for pivoting the read/write heads quickly and accurately in response to servo signals.

It is a further object of the present invention to provide a fixed, constant and repeatable head/tape interface across substantially the entire width of the data tape.

It is another object of the present invention to provide a tape drive having a close head/tape interface with a minimum of wear to the heads and the tape.

It is a still further object of the present invention to provide a tape drive having an efficient clean and uncomplicated design so as to be relatively inexpensive to manufacture.

These and other objects of the present invention are accomplished by an arcuate scan tape drive for transferring data to and from a data tape, including a frame with four walls and a cover, which frame and cover together have a 3½ inch form factor. A front side wall in the frame is provided with bezel having a slot for receiving a magnetic data tape cassette. Situated within the frame and cover is a read/write assembly for recording data onto and playing back data from the data tape, a capstan motor assembly for advancing the data tape past the read/write assembly, and a cassette positioning mechanism for receiving and securing the data tape cassette so that the tape is properly positioned as it is advanced past the read/write assembly.

The read/write assembly includes a head assembly having a plurality of magnetic core elements mounted on a rotating cylindrical drum. In one embodiment of the present invention, the read/write assembly may be provided in the frame of the drive such that the axis of rotation of the head assembly intersects the plane of the data tape at an oblique angle. In this embodiment, the front faceplate of the head assembly may be conically or spherically shaped, with the core elements provided at an outer radius on the faceplate. The pole tips of each core element extend slightly past the front of the faceplate such that, during a portion of the rotation of the head assembly, the pole tips are provided in close proximity to a section of the data tape positioned in the recording area. As the head assembly rotates, the core elements trace arcuate data tracks on the tape media substantially transverse to the longitudinal direction of motion of the tape.

The shape of the front face of the faceplate and the degree of penetration of the faceplate into the plane of the data tape are precisely controlled so as to provide a compound bend in the data tape. The compound bend is achieved because, as a length of data tape encounters the rotating faceplate, the tape is bent both across its length and its width. The tape opposes being bent in two different dimensions, with the result that stiffness is created in the tape in the border region between the two different bends, and this stiff region extends across substantially the entire width of the data tape. Moreover, this stiff region of the tape has a substantially fixed, constant and repeatable geometry and spacial relation as the tape travels past the recording area. Thus, the compound bend provides a better head/tape interface across the width of the data tape than that achieved with conventional arcuate scan recording systems.

The head assembly is attached to and rotated by an inside-out spin motor. The inside-out spin motor is comprised of a magnetic rotor and a set of stationary stator windings. The spin motor is servo controlled to rotate at a constant speed during both read and write operations by reference to an internal clock on a printed circuit board. It is important to maintain a constant speed of the spin motor so as to create precisely spaced data tracks on the tape.

The head assembly and the rotor of the inside-out spin motor are mounted on a central shaft, which shaft is rotatably supported by a bearing housing so that the rotating head assembly, the rotor magnet, and the central shaft all rotate as a single unit. The bearing housing is in turn pivotally supported on a base mount which is affixed to the frame of the tape drive. The base mount supports the bearing housing at two aligned points so as to allow the bearing housing, and components rotationally mounted thereto, to pivot about a tilt axis, which tilt axis is roughly halfway along the length of the read/write assembly. Tape drives and cassettes are manufactured with slight variations due to manufacturing tolerances. Therefore, a data tape which was recorded in one tape drive may be higher or lower with respect to the core elements when that cassette is played back. Moreover, when the tape media is moving in the longitudinal direction past the head assembly, the tape may wander slightly upward or downward in a direction transverse to the general direction of advancement of the tape. The bearing housing is supported to pivot in order to overcome these problems. Through servo mechanisms, the rotational axis may be adjusted to accurately align with a prerecorded centerline during a write cycle, and with the center of the data track during a read cycle.

Pivoting of the rotational axis is accomplished by a voice coil motor provided at the rear of the read/write assembly. The voice coil motor includes a single coil of electrically conductive windings provided in a rear section of the read/write assembly and a magnet supported on the base mount in close proximity to the winding. An electrical current through the winding will cause the coil to move up or down to thereby tilt the rotational axis of the central shaft and head assembly either up or down, depending on the direction and magnitude of the current. Servo mechanisms and feedback signals adjust and control the electrical current through the voice coil motor to maintain an accurate alignment of the rotational axis with the data tape.

Flex circuits may be provided for transferring control signals to the spin motor and tilt motor and for transferring data between the read/write assembly and a printed circuit board mounted adjacent to the read/write assembly.

BRIEF DESCRIPTION OF THE DRAWINGS

The invention will now be described with reference to the drawings, in which:

FIG. 4 is an enlarged perspective view of the right cassette positioning mechanism of the present invention;

FIG. 10c is a view of the faceplate according to the present invention through line c—c in FIG. 10a;

FIG. 12 is a perspective view of a core element according to the present invention;

FIG. 12a is a side view of a core element according to the present invention;

FIG. 12b is a top view of a core element according to the present invention;

DESCRIPTION OF PREFERRED EMBODIMENTS

A tape drive according to the present invention will be described herein with reference to FIGS. 1–21. As discussed in greater detail below, the present invention relates generally to a 3½ inch form factor arcuate scan tape drive having a plurality of read/write heads for transferring data to and from a ¼ inch width magnetic data tape. It is understood, however, that the present invention may be formed to various sizes and that the invention may operate with various magnetic tapes and tape carriers.

Figure 1:
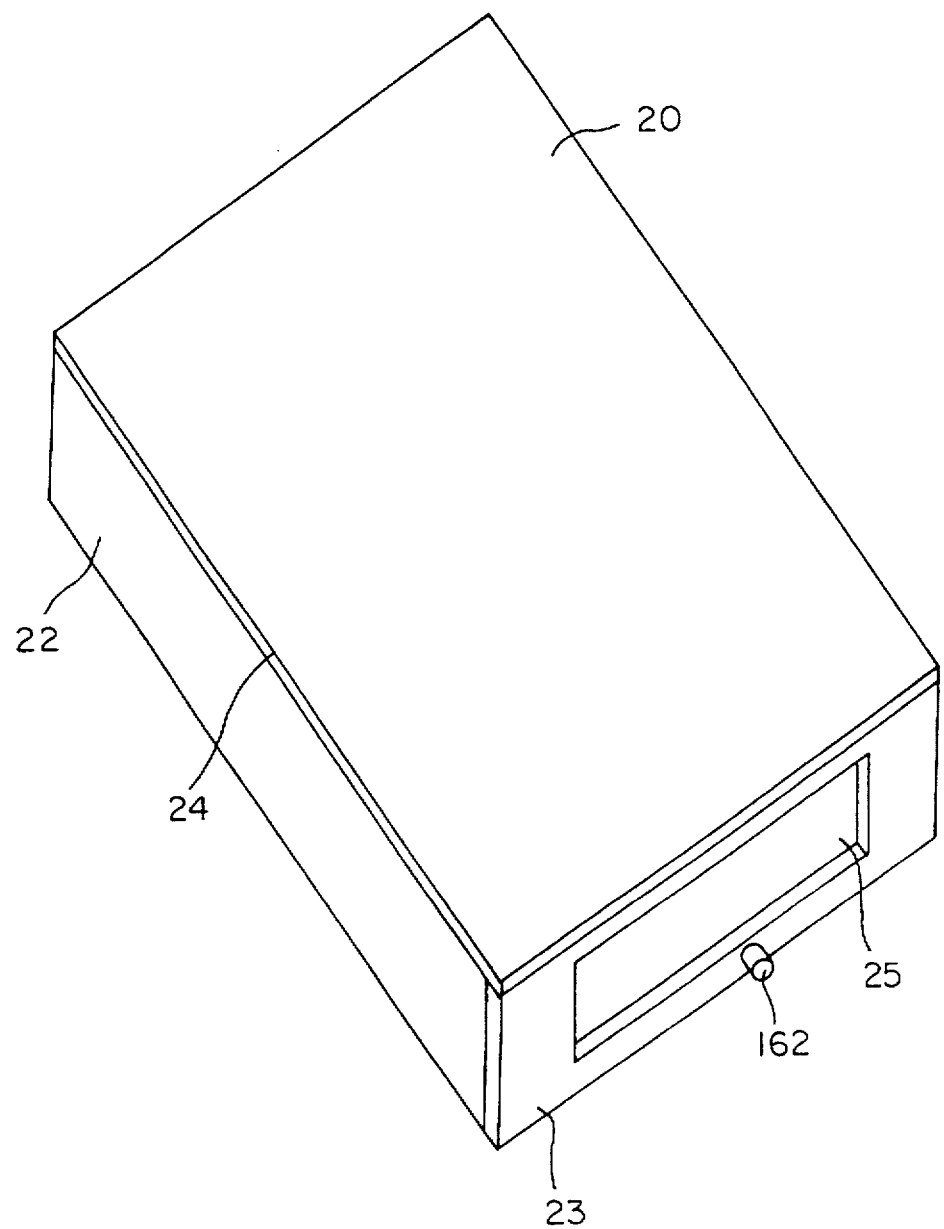
FIG. 1 is a perspective view of the exterior of the tape drive according to the present invention.
Figure 2:
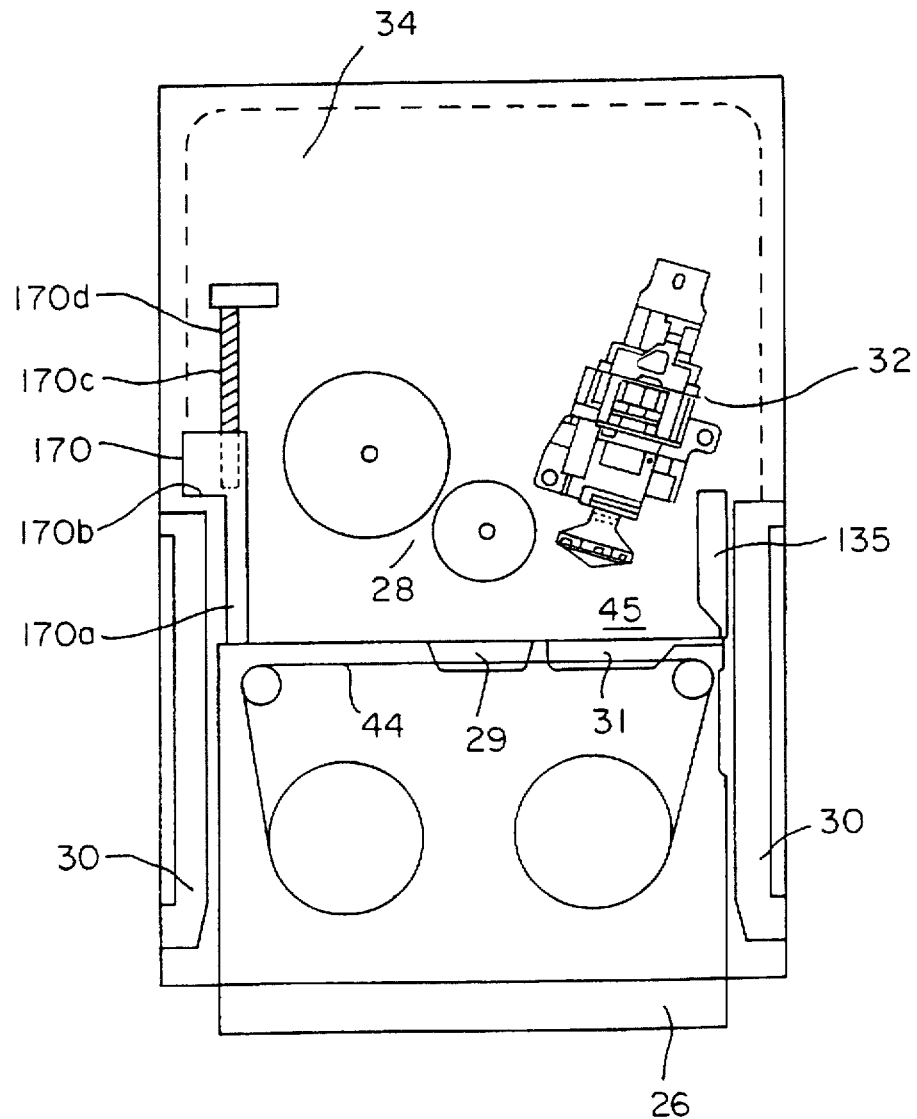
FIG. 2 is a top view of the tape drive according to the present invention with the internal drive components exposed.

Referring now to FIG. 1, there is shown a tape drive 20 having a 3½ inch form factor with a length of 6.0 inches, a width of 4.0 inches and a height of 1.0 inches. The drive 20 includes a frame 22 preferably formed of diecast aluminum, and a cover 24 preferably formed of sheet stainless steel. The frame 22 includes two side walls, a rear wall and a front wall. The front wall is preferably comprised of a bezel 23, which bezel includes a door 25 covering a slot for accepting a tape cassette 26 (FIG. 2). Door 25 is spring biased into a closed position in the absence of a cassette 26 to prevent particulate matter from entering the drive. Cover 24 may preferably be a substantially flat plate which may be secured to the frame 22 by means of screws fitting through the cover 24 into threaded bores in the side walls of the frame 22. Cover 24 may alternatively be affixed to the frame 22 by sliding into tracks formed in two opposite side walls of frame 22. As shown in FIG. 2, the frame 22 and cover 24 together provide a housing for a capstan motor assembly 28, cassette positioning mechanism 30 and read/write assembly 32. The drive 20 further includes a printed circuit board ("PCB") 34 having the control electronics for the drive. The PCB 34 is provided both on the underside and on a portion of the top side of frame 22.

A data tape 44 may preferably be contained in a minicartridge tape cassette 26, and is preferably about ¼ inch wide. It is understood, however, that the present invention may operate with various data tapes and tape carriers. Once recorded, the tape 44 includes guard bands of unused tape at the top and bottom of the tape to compensate for tape movement transverse to the general direction of travel of the tape. In order to maximize the storage capacity of the data tape, the guard bands are preferably 0.010 inches or less, thus leaving a net usable width of approximately 0.23 inches or more. Tape 44 may be approximately 295 feet long, although this length may vary. The cassette includes a metal baseplate to support the components within the cassette, and to increase the stability of the cassette. In operation, tape 44 travels from a supply reel, past a front face of the cassette juxtaposed to the read/write assembly 32 and is stored on a take-up reel. The tape is advanced between the take-up and supply reels by means of a belt within the cassette 26. The belt is wrapped around a wheel within the cassette which is driven by the capstan motor assembly as explained below. The front face of the cassette may preferably include two openings, 29 and 31, in which are received a portion of the capstan motor assembly 28 for advancing the tape 44, and a portion of the read/write assembly 32 for transferring data to and from tape 44, respectively. When the cassette 26 is disengaged from the tape drive, the opening 31 is normally covered by a tape shield 135 hingedly mounted at the front edge of cassette 26 to prevent particulate matter from accumulating on the data tape. During insertion of cassette 26, the right cartridge guide 134 (FIG. 4) engages and swings open tape shield 135 to provide access to the data tape by the read/write heads.

Capstan Motor Assembly

Figure 3A:
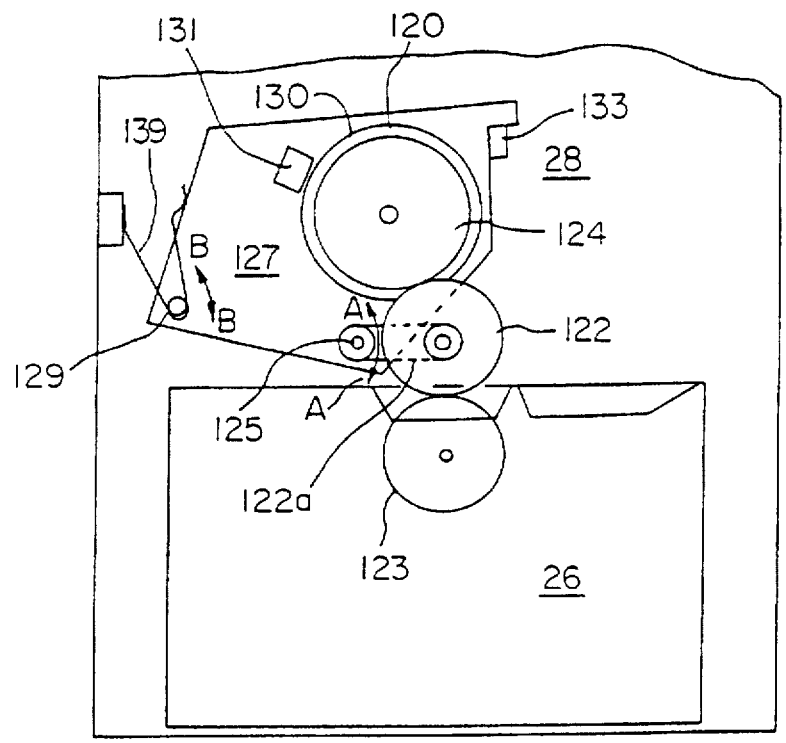
FIG. 3a is a top view of the capstan motor assembly and its relation to a tape cassette used with the present invention.

The capstan motor assembly 28 (FIGS. 3a and 3b) is provided to advance the data tape 44 past the read/write assembly 32. As shown in FIG. 3a, the capstan motor assembly 28 includes a capstan drive roller 120 in physical contact with an idler 122. Idler 122 is small enough to be received through the opening 29 in the front face of cassette 26 to thereby contact the capstan belt driver wheel 123 within the cassette 26. A variable speed motor 124, controlled by PCB 34, causes rotation of the capstan roller 120. The roller 120 rotates idler 122, which in turn rotates wheel 123 to advance the tape 44. Variable speed motor 124 is provided to drive tape 44 for both high speed operations, such as searching and rewinding, and low speed operations, such as writing and playback.

In order to detect the actual speed of the capstan motor 124, an encoder 130 is provided around the outer circumference of the capstan motor. A sensor 131 is provided adjacent to encoder 130 to sense the rotational speed of the encoder 130. In a preferred embodiment, encoder 130 may be a magnetically imprinted ring and sensor 131 may be a magneto resistive sensor. Thus, sensor 131 is provided to sense magnetic flux changes in the encoder 130. It is understood that other conventional encoder/sensor systems, such as an optical system, may be employed to sense the rotational speed of the capstan motor.

It is necessary to precisely control the speed at which the motor 124 rotates to advance tape 44. During a write cycle, the speed of the motor 124 is compared against a quartz crystal oscillator (not shown) included on the PCB 34 to generate an error signal which is then used to correct the speed of the capstan motor 124, if necessary, through a conventional phase lock loop. This ensures that the data tape 44 is advanced past the recording area at a constant speed. The constant tape advancement speed, together with the constant rotational speed of the spin motor as explained below, ensures that the arcuate data tracks are evenly spaced.

During a write cycle, servo bursts are recorded near the upper and lower edges of the evenly spaced data tracks. During a read cycle, these servo bursts are used to determine if the tape is advancing at the proper speed such that the read elements align with the data tracks on the tape. Any misalignment will generate an error signal which is then used to correct the speed of the capstan motor 124. In this way, the advancement speed of the tape 44 may be precisely controlled for both read and write operations.

Idler 122 is supported on one end of swinging link 122A so as to pivot about a pivot point 125 in a direction indicated by arrow A—A as shown in FIG. 3a. The capstan motor 124, drive wheel 120, sensor 131 and pivot point 125 are all supported on a motor plate 127, which is also provided to pivot about a pivot point 129 in the direction of arrow B—B. Allowing the motor plate 127 and link 122A to pivot ensures a substantially equal contact pressure between the drive wheel 120 and the idler 122, and between idler 122 and the capstan belt driver 123. Torsion spring 139 is provided about pin 129 to ensure the proper contact pressure between the drive wheel 120 and the idler 122, and between the idler 122 and the capstan belt driver 123. When the tape cassette 26 is disengaged from the drive 20, the motor plate 127 is biased against a stop 133 mounted to frame 22 by torsion spring 139.

Figure 3B:
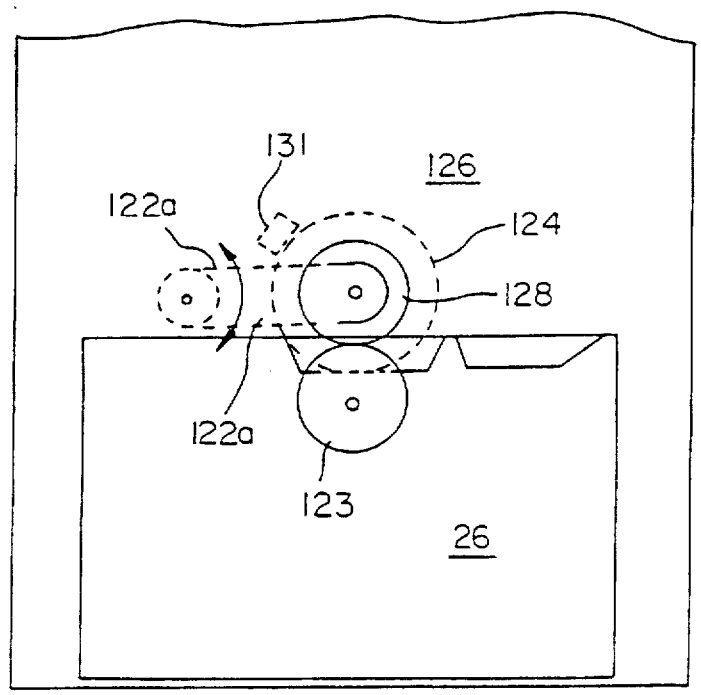
FIG. 3b is a top view of an alternative embodiment of the capstan motor assembly.

In an alternative embodiment shown in FIG. 3b, the present invention may include a capstan motor assembly 126 which is located underneath the cassette 26 when the cassette 26 is received within drive 20. In this embodiment, a capstan roller 128 is fixedly mounted to the top end of the rotating shaft of the variable speed motor 124. The capstan roller 128 is in physical contact with the capstan belt driver 123 when cassette 26 is properly positioned within drive 20 so as to advance tape 44 at a rate controlled by the motor 124. Such a design omits the need of an idler, which may otherwise increase the complexity of the capstan drive motor control, and increase the power required of the capstan motor to advance tape 44. However, such a design increases the height of the drive, and occupies space otherwise used on the printed circuit board.

The Cassette Positioning Mechanism

The cassette positioning mechanism 30 (FIGS. 2 and 4) is provided for receiving, accurately aligning and securing cassette 26 in a proper position once cassette 26 is inserted into drive 20. Mechanism 30 includes left and right cartridge guides mounted on opposite side walls of the frame 22. For clarity, the following discussion is primarily with regard to the right cartridge guide 134. The left cartridge guide is located in the opposite side wall, and in one embodiment is symmetrically opposite to the right guide. It is understood that the left and right cartridge guides may be structurally similar or dissimilar in alternative embodiments. However, the operation of the pawl 142 and the leaf spring 156, as described below, is identical in both the right and left cartridge guides. Adopting the directional convention shown on FIG. 4, the left and right cartridge guides properly position cassette 26 within drive 20 in the XZ plane (i.e., the Y direction), the XY plane (i.e., the Z direction) and the YZ plane (i.e., the X direction).

In order to properly position cassette 26 in the Y direction, the cassette 26 is manually inserted into drive 20 until a front portion of the metal baseplate of cassette 26 butts up against stops 136 and 138 (FIGS. 5a and 5b) machined into the frame 22. Once in contact with stops 136 and 138, the cassette is properly positioned in the Y direction.

Figure 4A:
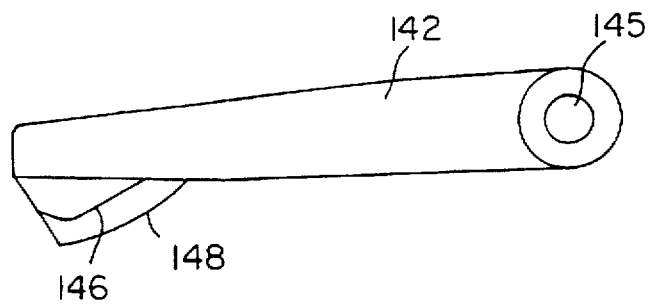
FIG. 4a is a top view of the right pawl of the cassette positioning mechanism according to the present invention.
Figure 4B:
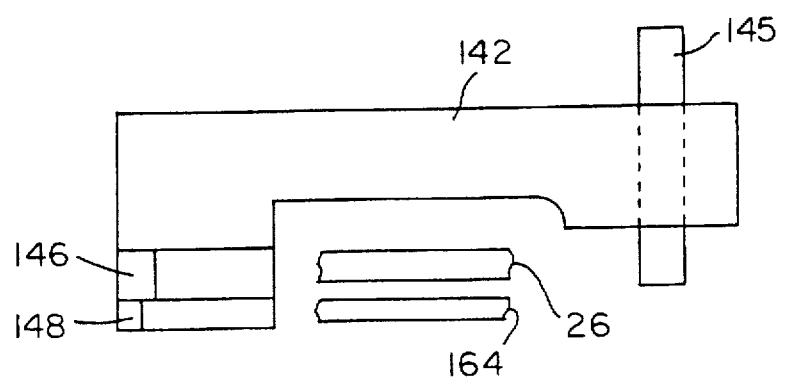
FIG. 4b is a side view of the right pawl of the cassette positioning mechanism according to the present invention.
Figure 7:
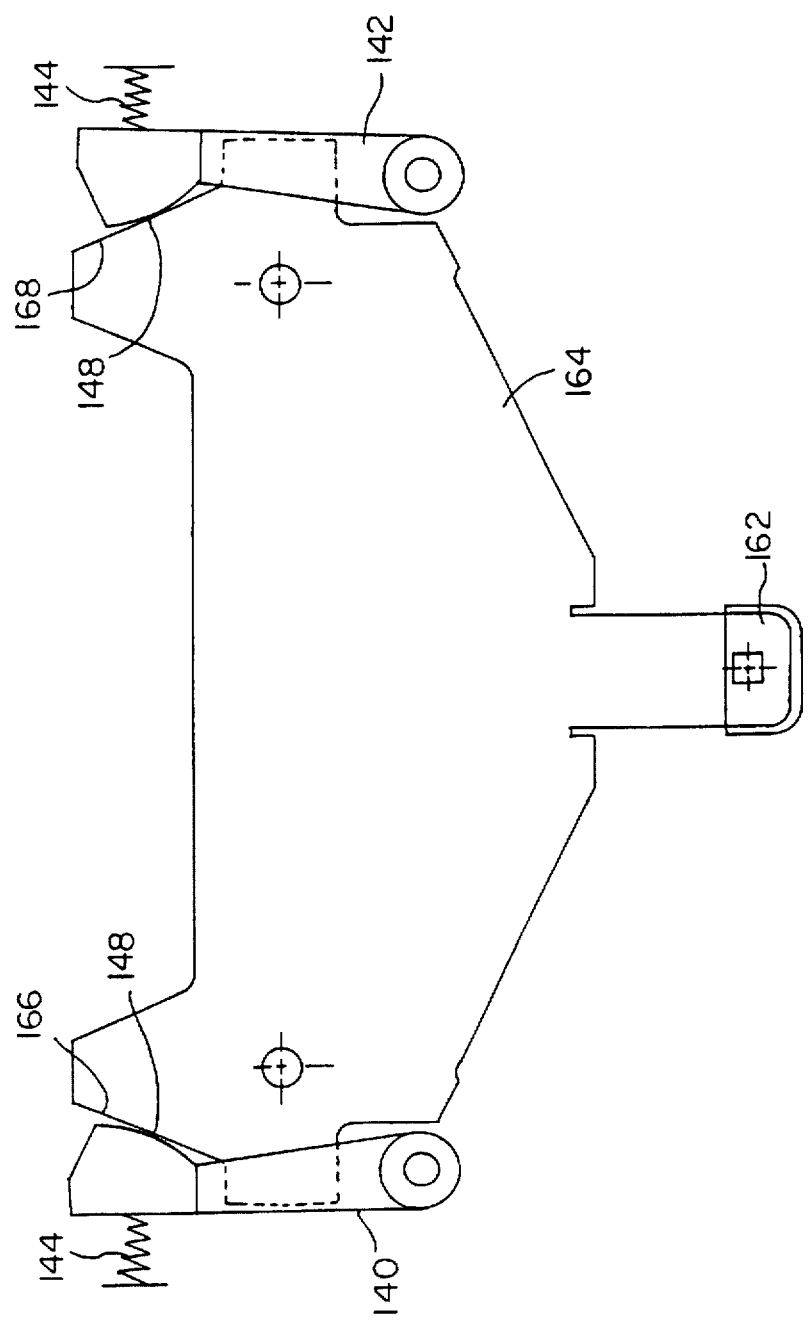
FIG. 7 is a top view of the cassette release mechanism of the present invention.

The left and right pawls are provided to secure and maintain cassette 26 against stops 136 and 138. Right pawl 142, which is structurally similar to the left pawl, is shown in FIGS. 4, 4a and 4b. Pawl 142 is rotatably mounted to the cartridge guide 134 by pin 145, and includes cassette engagement edge 146 and plunger engagement edge 148 (not shown on FIG. 4). In an alternate embodiment, the pawls pivot about a pin affixed to the frame 22. As seen in the side view of pawl 142 in FIG. 4b, cassette engagement edge 146 lies in the plane of the cassette baseplate 26 to lock the cassette into position within the drive 20 as explained in greater detail below. Plunger engagement edge 148 is provided on the pawl 142, adjacent to and below the cassette engagement edge 146 to lie in the plane of the plunger 164 (FIG. 7).

Figure 5A:
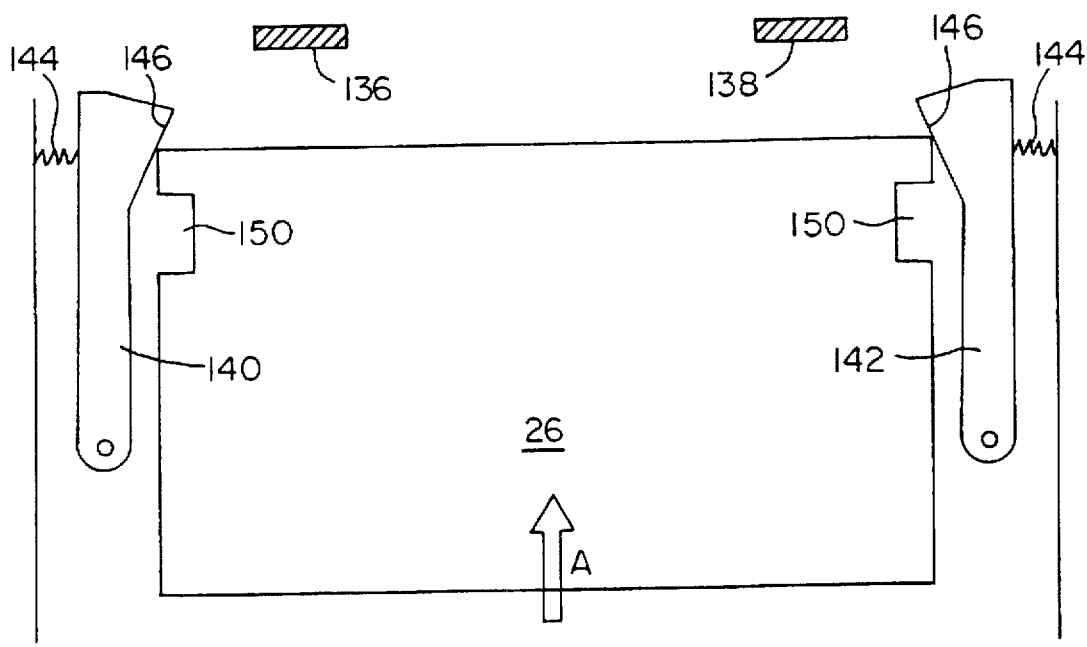
FIG. 5a is a top view of the left and right pawls as a cassette is inserted into the tape drive.
Figure 5B:
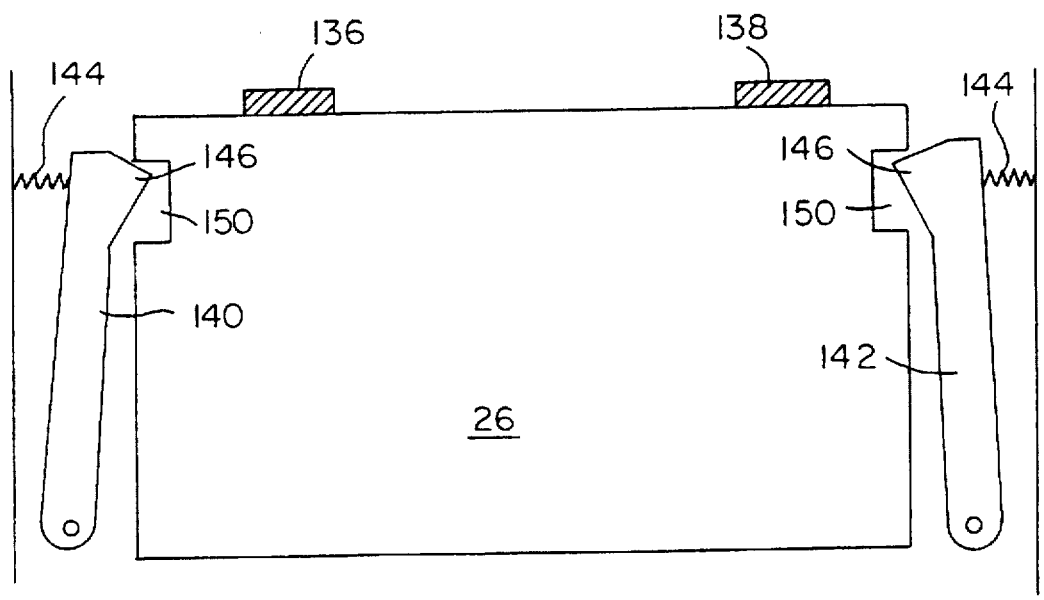
FIG. 5b is a top view of the left and right pawls securing a cassette within the tape drive.
Figure 6A:
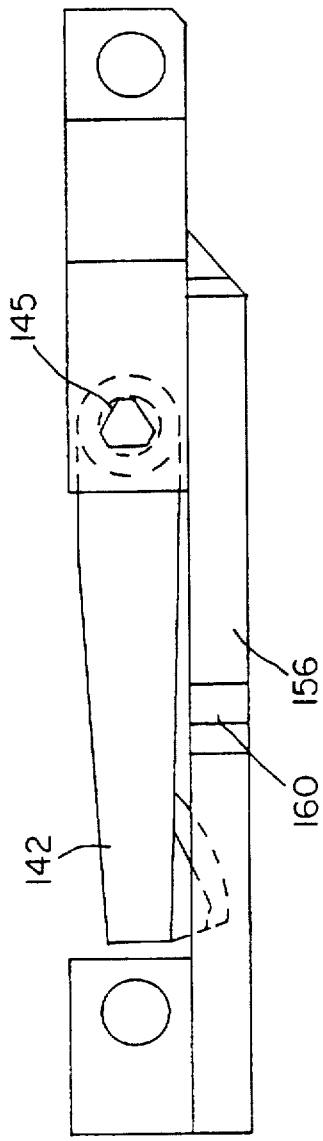
FIG. 6a is a top view of the right leaf spring of the cassette positioning mechanism according to the present invention.
Figure 6B:
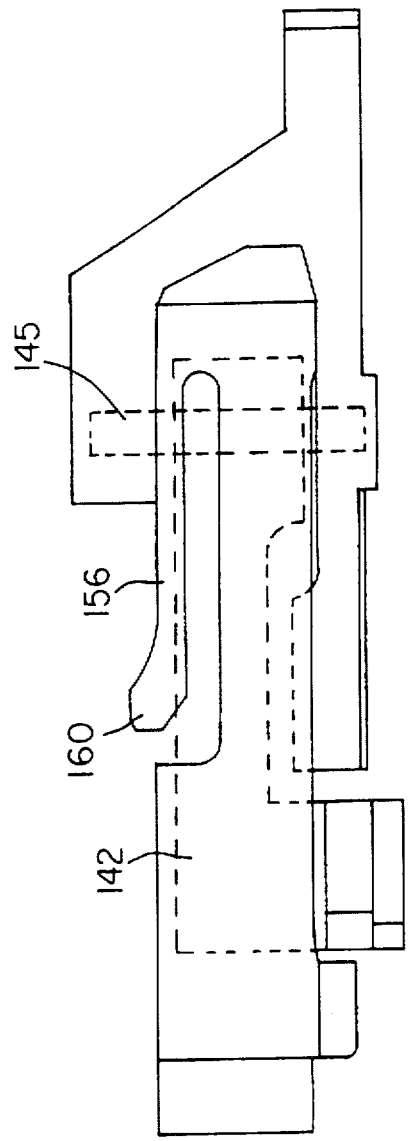
FIG. 6b is a side view of the right leaf spring of the cassette positioning mechanism according to the present invention.

With reference to FIGS. 5a and 5b, the left pawl 140 and right pawl 142 are biased inwardly (i.e., away from their adjacent side walls) by compression springs 144. In an alternative embodiment, compression springs 144 may be replaced in a consistent manner by torsional springs provided where the pawls are rotatably mounted to the cartridge guides. When cassette 26 is inserted into the drive 20 in the direction of arrow A, the corners of cassette baseplate 26 engage cassette engagement edges 146 to bias the pawls 140 and 142 outward. The cassette 26 is inserted far enough for cassette engagement edges 146 to engage slots 150 conventionally formed in both side edges of cassette 26. When the cassette engagement edges 146 encounter the leading edges of slots 150, the springs 144 force the cassette engagement edges 146 into slots 150. As the cassette engagement edges 146 enter the slots 150, the edges 146 act against the leading edges of slots 150 to accelerate the cassette 26 forward against stops 136 and 138 (FIG. 5b). The cassette engagement edges 146 remain in the slots 150 to lock the cassette into position within the drive until plunger 164 disengages the pawls from the slots 150 as explained hereinafter.

Conventional cassette positioning mechanisms include rollers on the underside of the drive baseplate, which rollers are biased upward into slots such as slot 150, thereby locking the cassette in proper position. Such rollers increase the height of the drive and require use of valuable space on the printed circuit board, generally mounted on the baseplate, which printed circuit board must be formed with a pair of openings to accommodate the rollers. In the present invention, however, the pawls are mounted on the sides of the drive, where they occupy otherwise unused space.

In order to position the cassette 26 in the Z direction, the left and right cartridge guides each include leaf springs 156 molded integrally with the cartridge guides. A right side leaf spring 156, which is structurally similar to the left leaf spring, is shown only in FIGS. 4, 6a and 6b. The leaf springs are formed with a leaf spring end section 160. As cassette 26 is inserted into drive 20, the end section 160 engages the underside of a flange conventionally formed on both sides of cassette 26. Thus, the end sections on both of the left and right leaf springs bias cassette 26 upward until the upper surface of the cartridge baseplate contacts locating pads molded into the cartridge guides. It is then properly positioned in the Z direction. The leaf spring of the left guide further includes a dimple on the end section which engages the side of cassette 26 to force the cassette 26 in the X direction against a stop surface molded into the right cartridge guide.

The leaf springs are preferably formed from a high strength plastic such as type WE1210 manufactured by General Electric, Pittsfield, Mass. 01201. WR1210 is a high strength plastic which maintains its structural integrity under a continuous stress. Thus, the stresses in the leaf springs due to the presence of the cassette 26 will not dissipate over the life of the drive 20 and the leaf springs will consistently maintain proper alignment of cassette 26 in the X and Z directions. The leaf springs are provided to withstand at least 7,500 insertions of cassette 26 into drive 20. WR1210 further includes 10% teflon so as to reduce friction between the cassette and the leaf springs upon insertion of the cassette into the drive so as to reduce the forces required to insert and eject the cartridge.

As shown in FIG. 7, cassette 26 may be ejected from drive 20 by depressing a cartridge eject pin 162 located in the front side wall of the drive. Cartridge eject pin 162 is attached to a plunger 164, including wedges 166 and 168, mounted in the frame 22 under the cassette 26. When cartridge eject pin 162 is pushed inward, wedges 166 and 168 move to engage the plunger engagement edges 148 of the pawls, thereby biasing the plunger engagement edges outward. The plunger engagement edges are preferably arcuately shaped, so that, as wedges 166 and 168 move, the wedges engage different sections of edges 148. This serves to reduce wear on any one portion of the edges 148, which would otherwise result from friction between the edges 148 and the wedges 166 and 168.

When cartridge eject pin 162 is pressed, the wedges 166 and 168 move plunger engagement edges 148 outward until the cassette engagement edges 146, adjacent thereto, are fully disengaged from the slots 150. At this point, tape cassette 26 is biased out of drive 20 by means of ejector 170 (FIG. 2) acting on the front edge surface of cassette 26. Ejector 170 includes an extension 170a for contacting the cassette 26, and a face 170b which abuts against the rear of the cartridge guide once a portion of the cassette is protruding out of the drive slot in the front side wall. The face 170b stops the motion of ejector 170 when the cassette 26 has moved far enough out of drive 20 to be manually grasped by an operator and removed from the drive. The ejector 170 is biased by an ejector spring 170c, which spring is compressed when the cassette 26 is inserted into the drive 20. Both the ejector 170 and ejector spring 170c freely slide over a guide rod 170d mounted within frame 22. The ejector 170 acts on only one side of cassette 26 to push cassette 26 out of drive 20. While acting on only one side of cassette 26, cassette 26 does not jam during ejection because of the close fit of cassette 26 between the left and right cartridge guides in the X direction and because the cartridge guides have a low coefficient of friction. The drive may alternatively include a second ejector spring to act on the opposite side of cassette 26.

In an alternative embodiment, drive 20 may additionally include a release prevention device, which prevents cassette 26 from being ejected during active operation of the drive. The release prevention device may comprise a solenoid which receives current when the tape is in motion, which solenoid physically prevents cartridge eject pin 162 from being depressed.

The Read/Write Assembly

Figure 8:
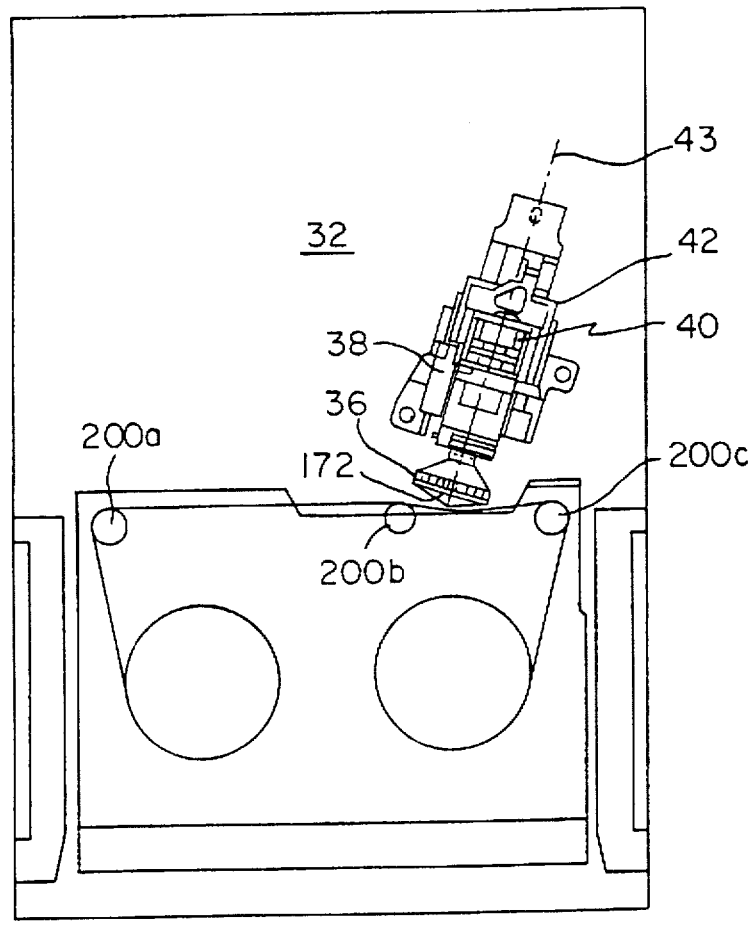
FIG. 8 is a top view of the read/write assembly in relation to the tape drive frame.
Figure 9:
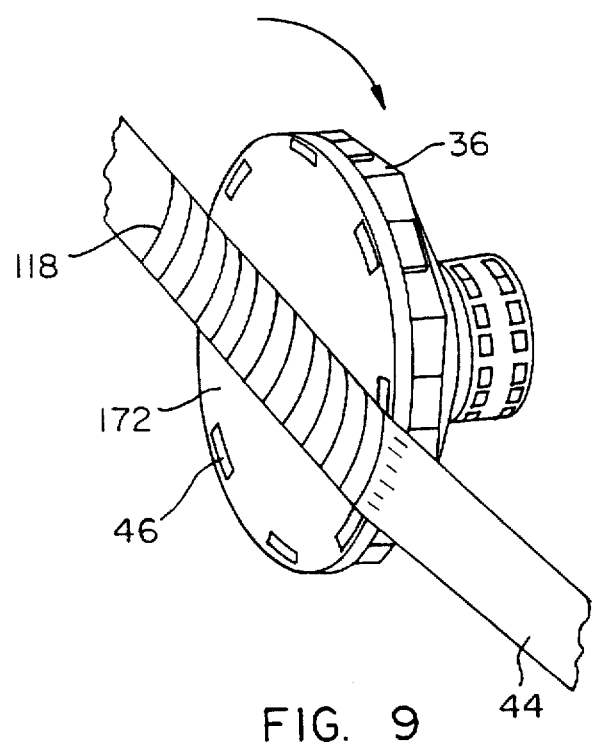
FIG. 9 is an enlarged perspective view of the front conical face of the read/write assembly in relation to a data tape.

The read/write assembly 32 will now be described with reference to FIGS. 8–19. In general, the read/write assembly 32 is comprised of a pivoting assembly which is pivotally mounted on a base mount 77 attached to frame 22. The pivoting assembly includes a rotating head assembly 36 for transferring data to and from the data tape 44, a spin motor 40 adjacent to the head assembly 36 for rotating the head assembly, a spin motor cap 67 for substantially enclosing the spin motor, and a voice coil motor coil 72 adjacent to the spin motor cap 69, which together with a magnet 74, causes the pivoting assembly to pivot in response to control signals from PCB 34. The pivoting assembly is pivotally supported by a bearing housing 52 mounted on base mount 77. Rotational axis 43 is defined by the rotational center of the head assembly 36 and spin motor 40. In one embodiment of the present invention, as shown in FIG. 8, the read/write assembly 32 may be obliquely provided with respect to the freestate plane of the data tape 44 so that the rotational axis 43 forms an angle of approximately 2.0 degrees with a line perpendicular to the freestate plane of tape 44. As explained in greater detail below, this angle may alternatively be lesser or greater than 2.0 degrees. The oblique angle of the read/write assembly 32 has been exaggerated in the Figures for clarity.

The features of the present invention responsible for establishing the head/tape interface will now be explained with specific reference to FIGS. 9–10, and 12–13c. A plurality of magnetically permeable core elements 46 are provided around an outer radius of a faceplate 172. During operation of the drive 20, the head assembly rotates, for example, clockwise as tape 44 advances past the faceplate so that the core elements 46 trace out a plurality of arcuately shaped data tracks 118 on the data tape 44 in a recording area 45 (FIG. 2). During one full rotation of the head assembly 36, each core element 46 will traverse the data tape 44 twice, once during a recording pass, where the core elements record or play back the data tape, and once during a return pass, where no data is transferred between the core elements and the tape. In the embodiment shown in FIG. 9, a read or write operation begins at the top portion of the tape 44. It is, however, understood that the head assembly 36 may rotate in a counterclockwise direction, and that a read or write operation may begin at the bottom portion of the tape 44.

Faceplate 172 forming the front face of the head assembly 36 is preferably spherically shaped, and may alternatively be conically shaped. Thus, with the read/write assembly provided at an oblique angle with respect to the data tape, the core elements are adjacent to the data tape during the read or write pass and will be spaced away from the data tape in the return pass. With this design, a close head/tape contact is established during recording or playback, and head/tape wear is reduced by spacing the tape away from the core elements when the core elements are not reading or writing. The spherical or conical shape of the faceplate 172 has been exaggerated in the Figures for clarity.

Figure 10:
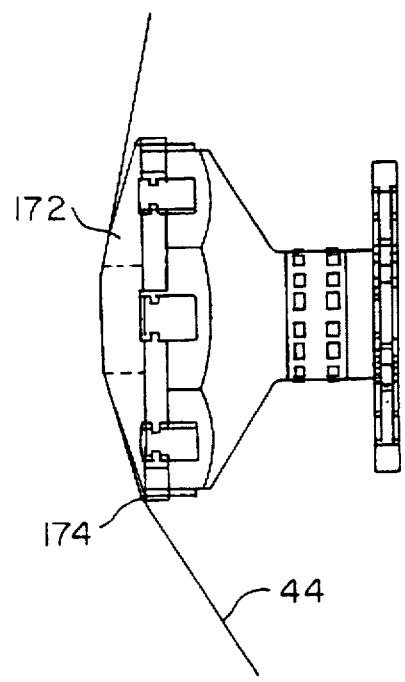
FIG. 10 is an enlarged top view of the front conical face of the read/write assembly in relation to a data tape.
Figure 10A:
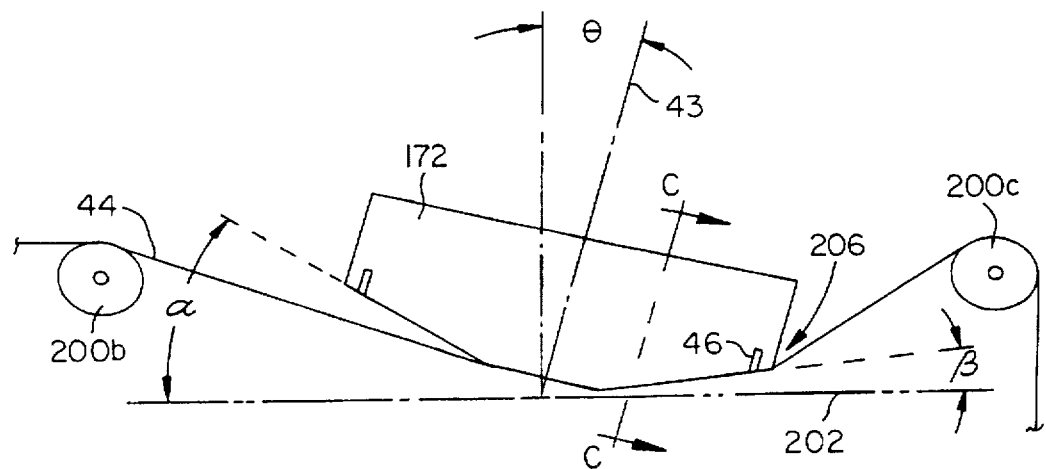
FIG. 10a is an enlarged cross-sectional top view of a front conical faceplate of the read/write assembly in relation to a data tape.
Figure 10B:
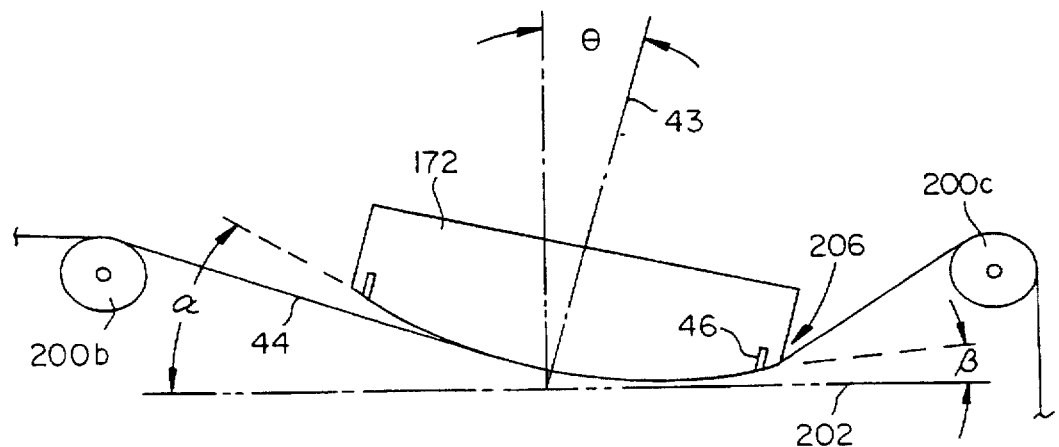
FIG. 10b is an enlarged cross-sectional top view of a front spherical faceplate of the read/write assembly in relation to a data tape.

As shown in FIGS. 8, 10a and 10b, faceplate 172 may preferably penetrate into the plane of the data tape from approximately 0.005" to 0.030" and optimally about 0.010" to 0.020", thereby forcing the data tape passing between cassette guides 200b and 200c to wrap around a portion of the faceplate. As previously stated, the read/write assembly in this embodiment is angled so that rotational axis 43 forms an angle θ of approximately 2.0 degrees with the freestate plane of the data tape. The "freestate plane of the data tape" refers to a plane in which the data tape is located when not affected by the faceplate penetration. Situated at this angle and penetrating into the tape over this range, the half of faceplate 172 including the active core elements (i.e., those on the read/write pass) preferably forms an angle β of about 0.50 degrees with a line 202 parallel to the freestate plane of the data tape. The half of faceplate 172 including the inactive core elements preferably forms an angle α of approximately 4.50 degrees to the freestate tapepath.

The penetration of the faceplate 172 into the plane of the tape, and the angles α, β and θ may all vary in alternative embodiments of the invention. For example, in a further embodiment, the half of the faceplate including the active core elements may be parallel to the plane of the data tape (i.e., β equals 0 degrees). In this embodiment, the angle α is preferably about 5.0 degrees and the slant angle θ is preferably about 2.50 degrees. In a further embodiment, the angles α and β may be equal and the slant angle θ is zero degrees. However in this embodiment, without additional mechanisms such as the shrouds 49a and 49b described with reference to FIG. 11a below, the tape will contact the core elements 46 during both the recording and return passes. It is understood that various other penetrations and angles α, β and θ may be used and still be within the scope of the invention.

As explained in the Background of the Invention section, it is necessary to provide a tension in data tape 44 during a read or write to both fix the position of the tape in space and also to ensure an adequate contact pressure between the read/write head and the tape. The tension imparted to the data tape 44 by cassette 26 alone is unable to create an adequate tension near the edges of the tape, thereby resulting in a poor head/tape interface near the edges in conventional arcuate scan recording devices.

Figure 10C:
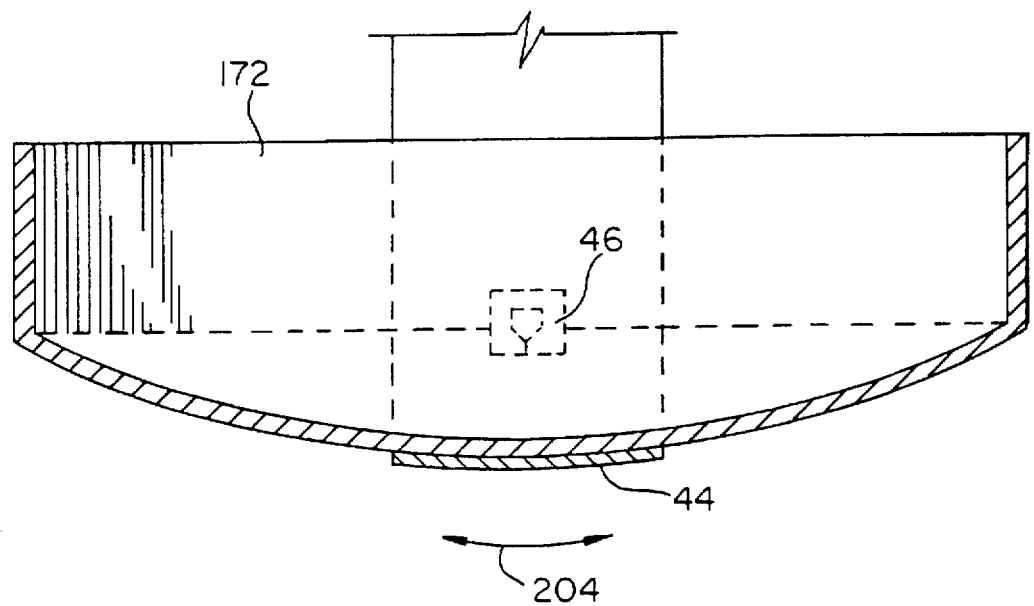

The present invention includes a novel construction and orientation of the head assembly which provides a tension across substantially the entire width of the data tape 44, thereby allowing a good head/tape interface across substantially the entire width of the tape. The angle and shape of the faceplate 172 is provided to produce a compound bend in data tape 44. One bend in the data tape is across the width of the tape when it encounters the outer radius of faceplate 172, as seen at 206 in FIGS. 10a and 10b. This width bend occurs as result of the faceplate 172 penetrating into the freestate plane of the data tape, thereby bending the tape across its width. A second bend in the data tape is in the longitudinal direction over the length of the tape in contact with the surface of faceplate 172, as seen at arrow 204 in FIG. 10c. FIG. 10c is a view of the faceplate 172 through line c—c in FIG. 10a. Viewed from the perspective of FIG. 10c, the conical faceplate 172 has a rounded surface. Although not shown, a similar cross-sectional view through the spherical faceplate in FIG. 10b would reveal a similar rounded surface to faceplate 172. As the data tape 44 travels over the faceplate 172, it conforms to the rounded surface of the faceplate, thereby causing the second bend in the tape in the longitudinal direction. The longitudinal bend in the tape is substantially orthogonal to the width bend in the tape.

The tape opposes being bent in two orthogonal dimensions, with the result that stiffness is created in the tape at the border region between the two different bends. This stiff region extends across substantially the entire width of the data tape. The stiff border region of the tape has a substantially fixed, constant and repeatable geometry and spacial relation as the tape travels past the record area 45. Therefore, the core elements 46 may be provided through the faceplate 172 to contact the tape, which is located in a known, substantially constant spacial location in the stiff border region. Moreover, the stiffness at the edges achieved by the compound bend allows the tape near the edges to exert a force against the core elements to counter the force exerted by the core elements against the tape. Thus, a close head/tape contact may be established over substantially the entire width of the data tape.

The ratio of the degree of width bend across the tape to the degree of longitudinal bend along the tape length must be precisely controlled to achieve head/tape contact across substantially the entire width of the tape. If the bend across the width is too severe, or if the faceplate 172 penetrates too far into the plane of the tape, then the width bend becomes too dominant and the tape separates from the faceplate at the edges of the tape. A penetration of 0.010" to 0.020", together with a slant angle θ of 2.0 degrees and an angle β of 0.5 degrees yields the optimal head/tape contact across the width of the tape. This optimal contact allows for maximum data storage and reduces the potential for read/write errors. As previously stated, however, the degree of penetration and the different angles may vary.

It is preferable to provide the faceplate 172 with a spherical surface, as opposed to a conical surface, for the reason that, with a spherical surface, the bend along the length of the tape (FIG. 10c), is most strongly formed at a point away from the outer radius of the faceplate 172. Forming the bend at this point creates the optimal border region between the two bends in the tape. While the invention contemplates the use of a conical faceplate, in that embodiment, the longitudinal bend is formed over the entire conical length of the faceplate/tape engagement surface. This does not generally offer as good a head/tape engagement across the width of the tape as with the spherical faceplate.

The faceplate 172 further includes a rounded edge 174 which accomplishes several features. First, the rounded edge acts as a guide for the tape to provide a smooth, aerodynamically uniform transition of tape 44 onto faceplate 172 in the recording area 45. Second, the degree to which the rounded edge 174 is sharp or gradual has an effect on the head/tape interface. The optimal radius for the rounded edge 174 is preferably from 0.050" to 0.300". The rounded edges also serve to reduce wear to the tape 44.

Figure 13A:
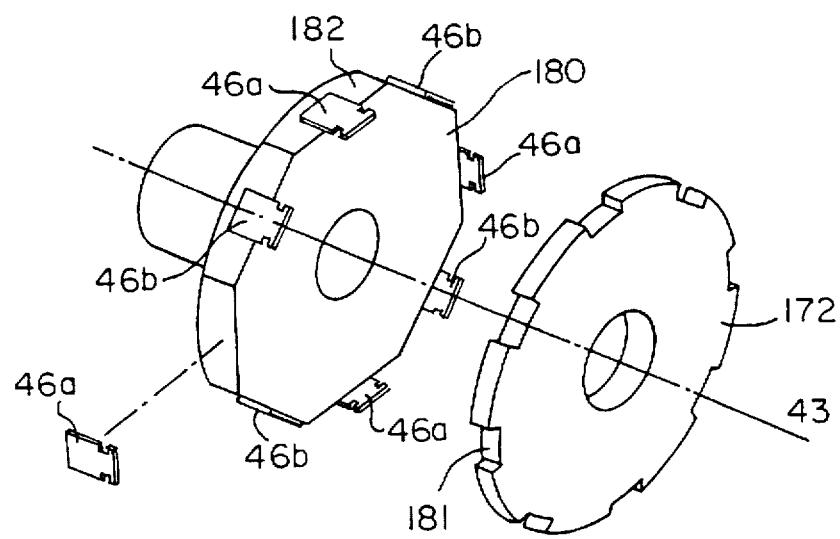
FIG. 13a is an exploded perspective view of the head assembly according to the present invention.
Figure 13B:
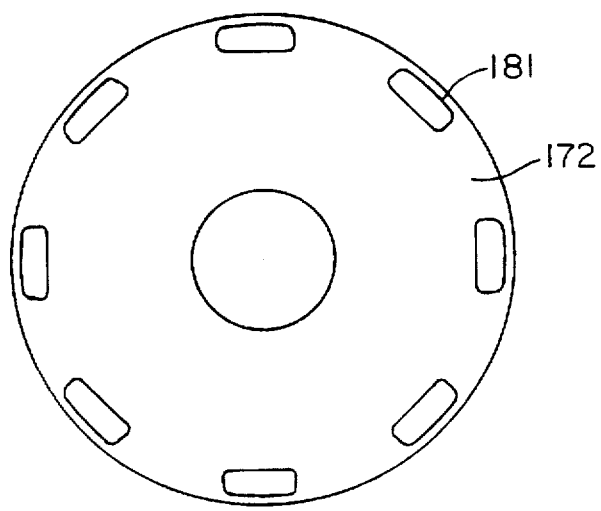
FIG. 13b is a front view of the faceplate according to the present invention.

As shown in FIG. 13b, the top of the faceplate 172 is provided with a plurality of slots 181 for receiving the plurality of core elements 46 therethrough. The slots 181 are preferably closed on all sides so that the outer perimeter of the faceplate is continuously circular. By enclosing the core element 46 on four sides, it is possible to change the penetration of the faceplate 172 into the plane of the tape over a certain range without significantly effecting the contact of the core element with the tape. By surrounding the core element on only three sides, with the outer section of the faceplate adjacent to the core elements removed, the head/tape interface is more sensitive to changes in faceplate penetration. Not all cartridges and tape drives are manufactured identically and as such, there will be slight variations in the degree of penetration of the faceplate into the data tape from cassette to cassette and from tape drive to tape drive. Enclosing the core element on all four sides provides the head/tape interface with a greater tolerance for changes in faceplate penetration. It is, however, contemplated that the faceplate 172 may be enclosed on only three sides.

In a preferred embodiment, the faceplate 172 may be formed from a ceramic material, which offers several advantageous properties, including its strength, that it is inert, that it has high resistance to wear, and that it may have highly polished surface finish. In an alternative embodiment, the faceplate 172 may be formed from a conductive material, such as zirconium. With the faceplate electrically grounded, a conductive faceplate may dissipate static electricity which may build up in the head assembly.

Figure 11:
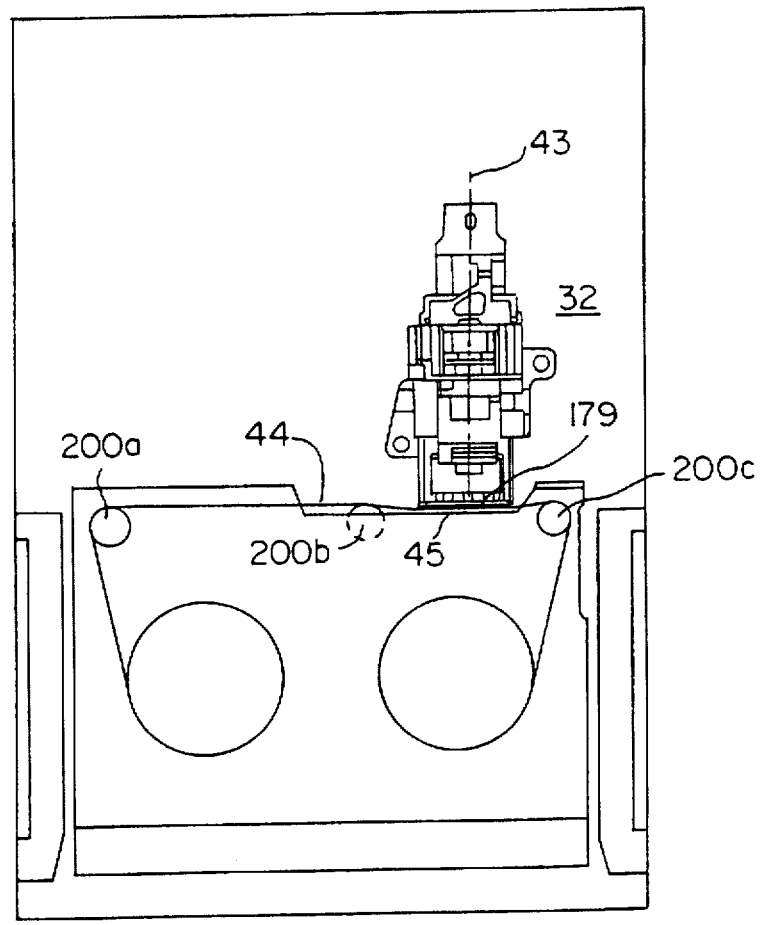
FIG. 11 is a top view of an alternative embodiment of the read/write assembly of the present invention.

In an alternative embodiment shown in FIG. 11, the head assembly 36 may be comprised of a substantially cylindrical body with a flat circular faceplate 179 at its front face. In this embodiment, the rotational axis 43 of read/write assembly 32 lies perpendicular to the surface of data tape 44 and the entire front circular face lies substantially parallel to the plane of data tape 44 in recording area 45. Core elements 46 are provided on front circular faceplate 179 as described above with respect to FIGS. 8-10.

Figure 11A:
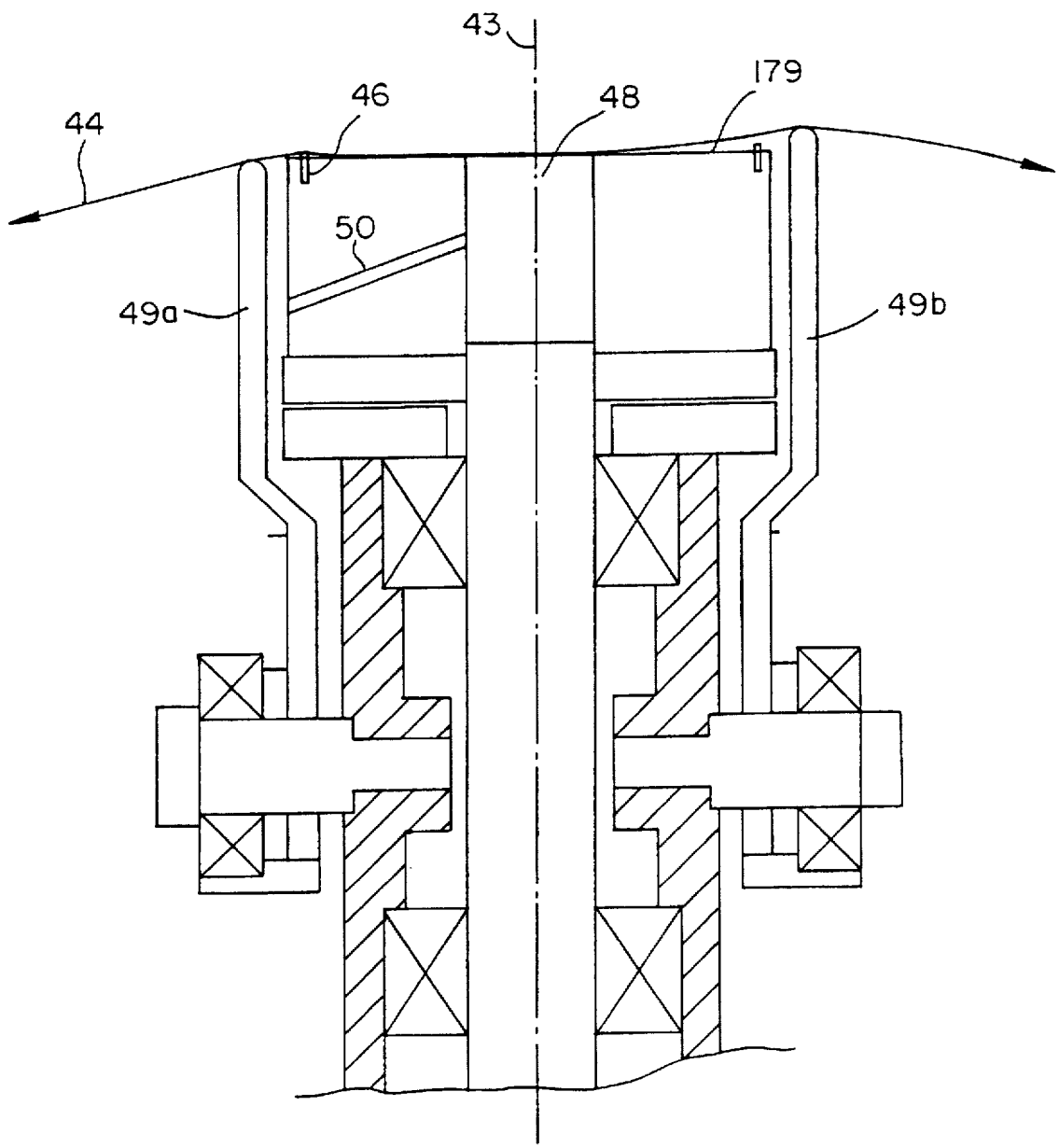
FIG. 11a is a cross-sectional view of the head assembly of the read/write assembly shown in FIG. 11.

The read/write assembly 32 in the embodiment of FIG. 11 may additionally include shrouds 49a and 49b for acting as tape guides during operation of the drive (FIG. 11a). As tape 44 advances in the recording area, a negative pressure between the tape and the faceplate directs the tape toward a core element 46 performing a read or write operation, and shroud 49b directs the tape away from the circular faceplate 179 after core element 46 has performed the read or write operation. Shrouds 49a and 49b may preferably be mounted to the base mount 77, on a pair of juxtaposed arms extending upward from the base mount. The shrouds may be mounted independently of each other after the head assembly 36 has been mounted on the read/write assembly and each shroud may be independently adjustable to protrude a precise distance past front circular faceplate 179. In a preferred embodiment, shroud 49b may protrude slightly further into the plane of the tape 44 than shroud 49a, preferably by about 0.003 inches, in order to ensure that tape 44 does not contact the elements 46 at the trailing edge of the faceplate 179. It is understood that shrouds 49a and 49b may additionally be used with the embodiment described with regard to FIGS. 8-10.

In the embodiments shown in FIG. 8-11a, the faceplate 172 or 179 may be formed with a cylindrical hole 48 (FIG. 11a) through the radial center of head assembly 36 and an angled side bore 50 communicating hole 48 with the surface of head assembly 36. As is known in the art, rotation of head assembly 36 will draw air into the hole 48 and out through side bore 50. Thus, as a section of the advancing data tape engages the faceplate 172 or 179, it is held in close contact with the faceplate by the air drawn into hole 48 as the core element traverses the tape to read or write a data track 118.

In an alternative embodiment, data tape 44 may be urged against core elements 46 by air or fluid pressure applied against the back (unrecorded) side of tape 44 to push it against the circular faceplate. Moreover, the present invention may include a turbine of known construction within the head assembly 36 for drawing in or expelling air. In a further embodiment, the present invention may operate without a central hole 48. The head assembly rotates at several thousand RPMs. As is known according to the Bernoulli effect, a negative pressure will be created at the outer radius of the faceplate relative to the center of the faceplate, thereby further drawing the tape into close contact with the outer radius of the faceplate.

As shown in FIG. 12, core elements 46 include a top edge portion protruding past the surface of the faceplate by approximately 0.0006 inches. The top edge portion is preferably arcuately shaped across its length, with a radius of curvature in a range of approximately 7 to 10 mm and optimally about 8 mm. The arcuate shape reduces wear on both the tape 44 and the core element 46. As seen in FIGS. 12a and 12b, the width of a core element 46 at its top edge portion is preferably about 3200 microinches (μ"), and is also rounded to further reduce wear to the tape and core element. Head gap 119 may be skewed to allow data tracks to read and written by azimuth recording in a known manner.

It is extremely important that a read or write core element 46 be precisely aligned with a data track 118 being read or written and it is therefore critical that the core element 46 and head gap 119 be located at a precisely controlled radius relative to the rotational axis of head assembly 36. In order to accomplish this, a core element 46 may be laser trimmed at the head gap 119. As previously stated, the core element has a thickness of approximately 3200 μ" across its width. As seen in FIG. 12b, by laser trimming a larger portion of the core element on one side than the other, the position of the head gap may be moved closer or farther from the rotational axis of the head assembly by a distance not exceeding the width of the top portion of a core element. In this way, the distance of the head gap 119 from the central axis my be precisely controlled. It is understood that methods other than laser trimming may be used to form the finished core element 46.

Figure 13C:
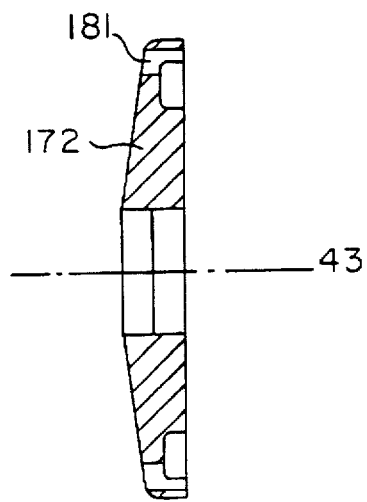
FIG. 13c is a cross-sectional view of the faceplate according to the present invention.

As shown in FIGS. 13a–13c, core elements 46 may be mounted on the flat edge surfaces of an octagonal head mounting drum 180, which may be affixed to or formed integrally with the faceplate 172. Head mounting drum 180 is preferably formed of a heavy metal, which may be laser balanced to allow the head assembly 36 to rotate without vibration.

In the embodiment of FIGS. 13a–13c, octagonal head mounting drum 180 includes four read core elements 46a and four write core elements 46b mounted to the eight flat edge surfaces. The core elements are alternately provided around drum 180 so that a read element 46a always neighbors a write element 46b and visa-versa. The present invention may alternatively include four core elements 46, two read elements 46a and two write elements 46b. In this embodiment the elements are again alternately provided on the flat edge surfaces of octagonal head mounting drum 180 with alternate edge surfaces left empty. It is additionally understood that head mounting drum 180 may be formed with more or less than eight surfaces and various numbers of core elements 46. Conical faceplate 192, or the flat faceplate 179 (shown in FIG. 11), is provided on the end face of octagonal drum 180. As previously explained, the faceplate is formed with slots 181 which correspond to the location of the core elements 46 so that once affixed to mounting drum 180, the core elements 46 are located in and protrude through the slots 181. The faceplate additionally serves to fill in the spaces between core elements 46 so that the outer perimeter of the faceplate nearest to the tape 44 is substantially circular. If the spaces between core elements 46 are not filled in, it has been found that, when the head assembly rotates, the data tape 44 occasionally contacted the points at which two flat edge surfaces of octagonal head mounting drum 180 came together. Such unintended contact could damage the tape. Even without causing damage, the open spaces were found to create aerodynamic instabilities in the tape edge, resulting in non-repeatability of recording within 0.010 inches of the tape edge.

After a data track is written by a write element 46b, that track is subsequently scanned by a read element 46a to check for errors. In a preferred embodiment, when a particular write element 46b records a data track 118, that track is not scanned by the next following read element. That data track is instead scanned by the read element 46a that follows the immediately adjacent read element. By using azimuth recording techniques, write elements 46b may record a plurality of data tracks 118 without data from one track impinging on the neighboring tracks. In this way, the highest number of data tracks may be read and written in a given length of data tape.

As the tape 44 is advancing while the core elements 46 rotate, it can be seen that in order for a read element 46a to error scan a data track previously recorded by a write element 46b (read after write), the radius from the center of head assembly 36 at which the read element head gap is located must be greater than the radius at which the write element head gap is located. This compensates for the distance the tape has travelled from the time the data track was written to the time it was read. In a preferred embodiment, the data tape may travel past the recording area at a speed of approximately 3.75 inches per minute, for example, and head assembly 36 may preferably rotate approximately 10,000 revolutions per minute. Thus, assuming a track pitch of approximately 0.0005 inches, in order for a read element 46a to retrace a data track recorded by a write element 46b as described above, optimal radii from the outer edge of the read element head gap and write element head gap to rotational axis 43 are preferably about 0.50500" and 0.30598", respectively. As stated above, the head gaps 119 of the read and write elements are provided at these radii by laser trimming.

Referring now to FIGS. 14a–14c and 15, the head assembly 36 and the rotor of spin motor 40 are mounted on a center shaft 52 (FIG. 15) which has rotational axis 43 as its axis of rotation. In the embodiment of the present invention including a central cylindrical hole 48 in the head assembly 36, the rear of cylindrical hole 48 is defined by the front end face of the shaft 52. The head assembly 36 is preferably mounted on shaft 52 by an adhesive, such as cyanoacrylate. It is understood that head assembly 36 may be mounted to shaft 52 by other conventional means, including cryogenic mounting, where the shaft 52 is first cooled and then the head assembly is placed thereon so that the shaft 52 expands upon warming to achieve a very tight fit.

The shaft 52 is rotatably supported in the midsection of read/write assembly 32 on a bearing housing 54 by a pair of spaced-apart bearings 55 (FIG. 15) in a known manner so as to allow rotation of the shaft 52, the spin motor rotor, and head assembly 36 as a single unit. The base mount 77 includes a pair of upwardly extending arms, in which are provided a second pair of aligned trunnion bearings 57, one bearing in each arm. The trunnion bearings 57 support trunnion pins 56a and 56b, which pins extend from the bearing housing and pass through trunnion bearings 57. The bearings 57 and pins 56a and 56b allow the bearing housing 54 and the attached structures to pivot for reasons explained below. Trunnion pins 56a and 56b are aligned with each other so as to define an axis of tilt 60 located approximately midway along the length of the rotating portion of the read/write assembly 32, preferably close to or at the center of rotational mass. The tilt axis 60 defined by trunnion pins 56a and 56b perpendicularly intersects rotational axis 43 running though the axial center of read/write assembly 32.

It is an important requirement in the present invention that it be possible to read a data tape from any compatible cassette in any tape drive constructed according to the present invention, regardless of whether the cassette was recorded in that tape drive or another. This requirement is complicated by several factors. First, where record and playback occur in different tape drives, slight variations from one tape drive to the next due to manufacturing tolerances may result in a recorded tape cassette being higher or lower with respect to the core elements during a subsequent play back of the cassette in the different drive. Second, slight variations from one tape cassette to the next due to manufacturing tolerances may result in a data tape being higher or lower within the cassette in different cassettes. Third, because the tape is narrower than the tape guides in the cassette, the tape may wander transversely to the general longitudinal direction of motion of the tape in the recording area.

For these reasons, the tilting feature of the present invention is provided to allow proper alignment of the core elements with the data tape during record and playback of the data tape. As seen on FIG. 15, the bearing housing 54, the central shaft 52, the head assembly 36, the spin motor 40, the spin motor cap 67, the conductive coils 72 of the voice coil motor 42, and the tongue 78 of the bicell assembly 76 (FIG. 19) are all provided to pivot as a single unit about tilt axis 60. For convenience, the above structures are collectively referred to as the pivoting assembly. The pivoting assembly is caused to pivot by voice coil motor 42, which acts in response to pivot servo control signals. The voice coil motor 42, the pivot servo controls and the operation of the other above mentioned components of the pivoting assembly are explained in greater detail below.

Figure 14A:
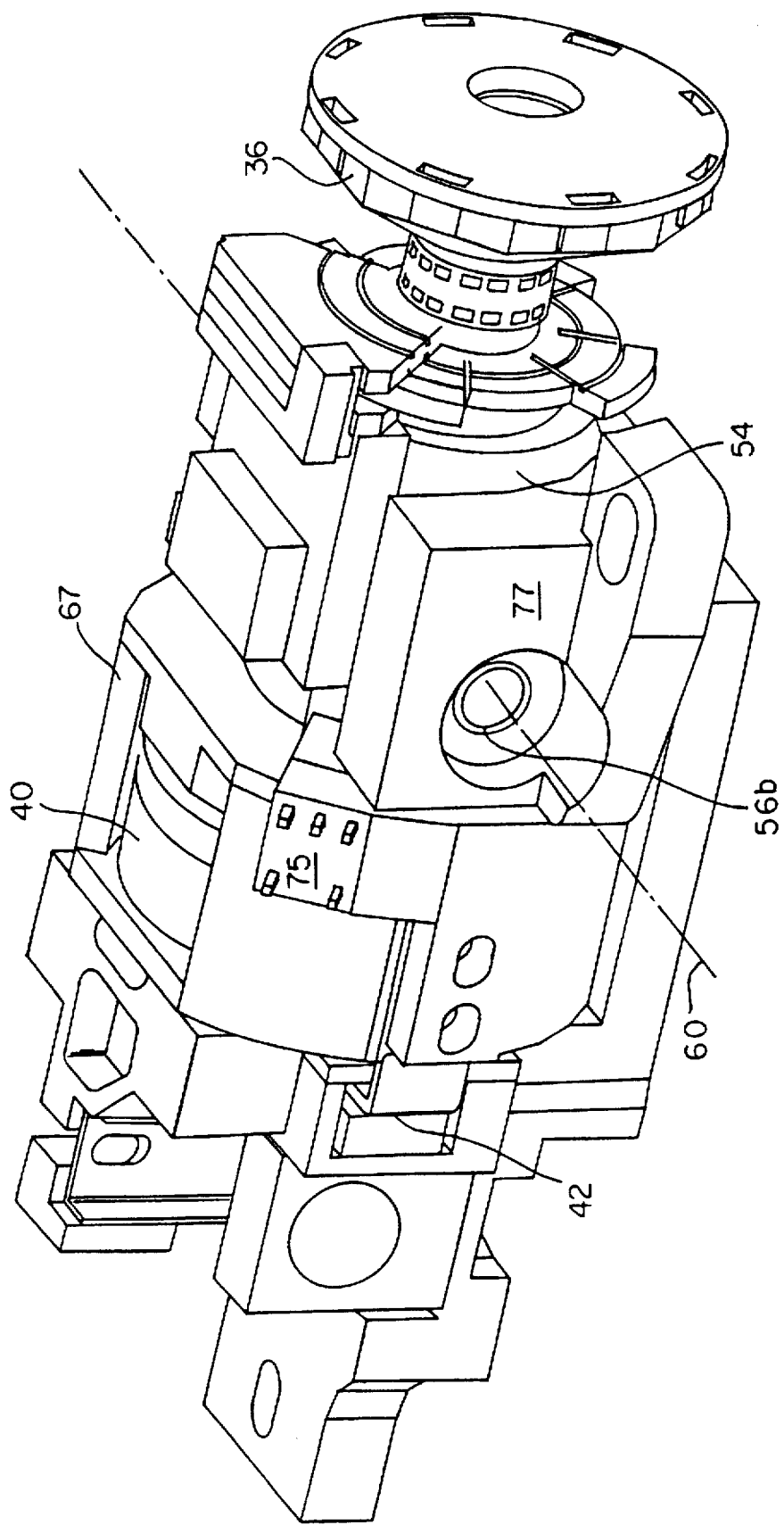
FIG. 14a is a perspective view of the read/write assembly according to the present invention.
Figure 14B:
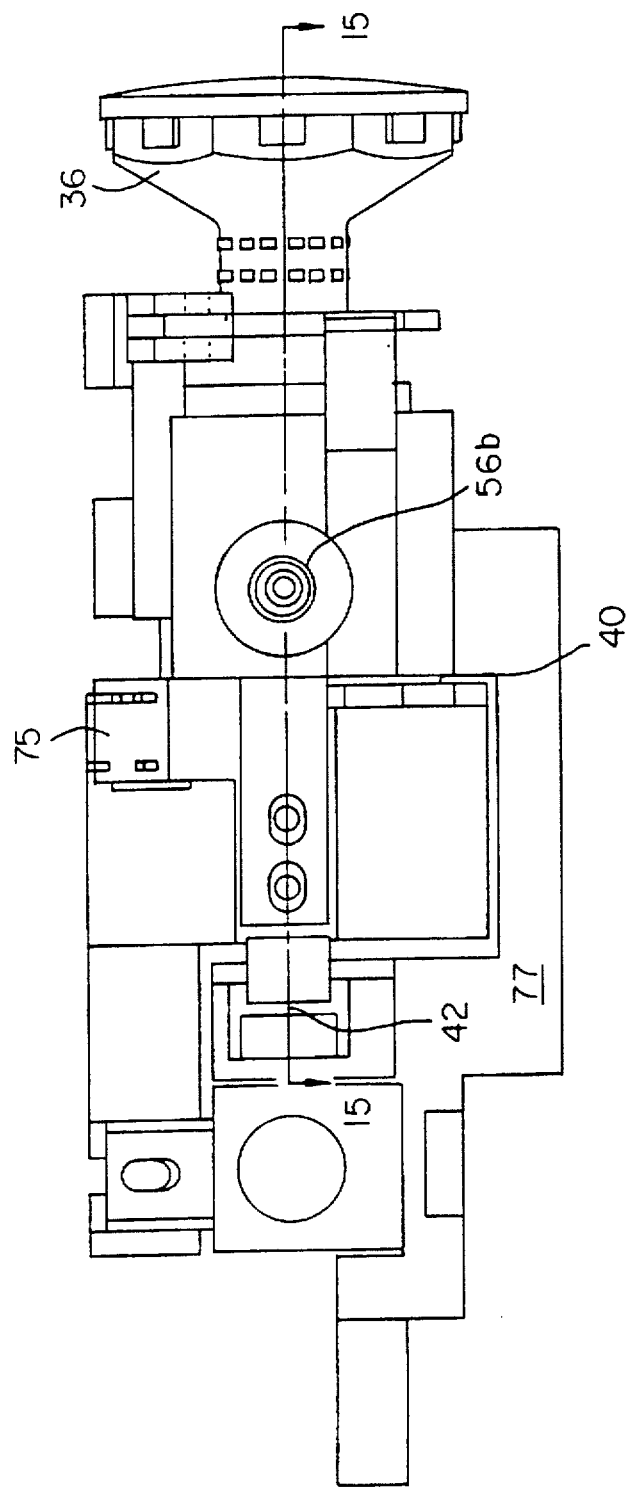
FIG. 14b is a side view of the read/write assembly according to the present invention.
Figure 14C:
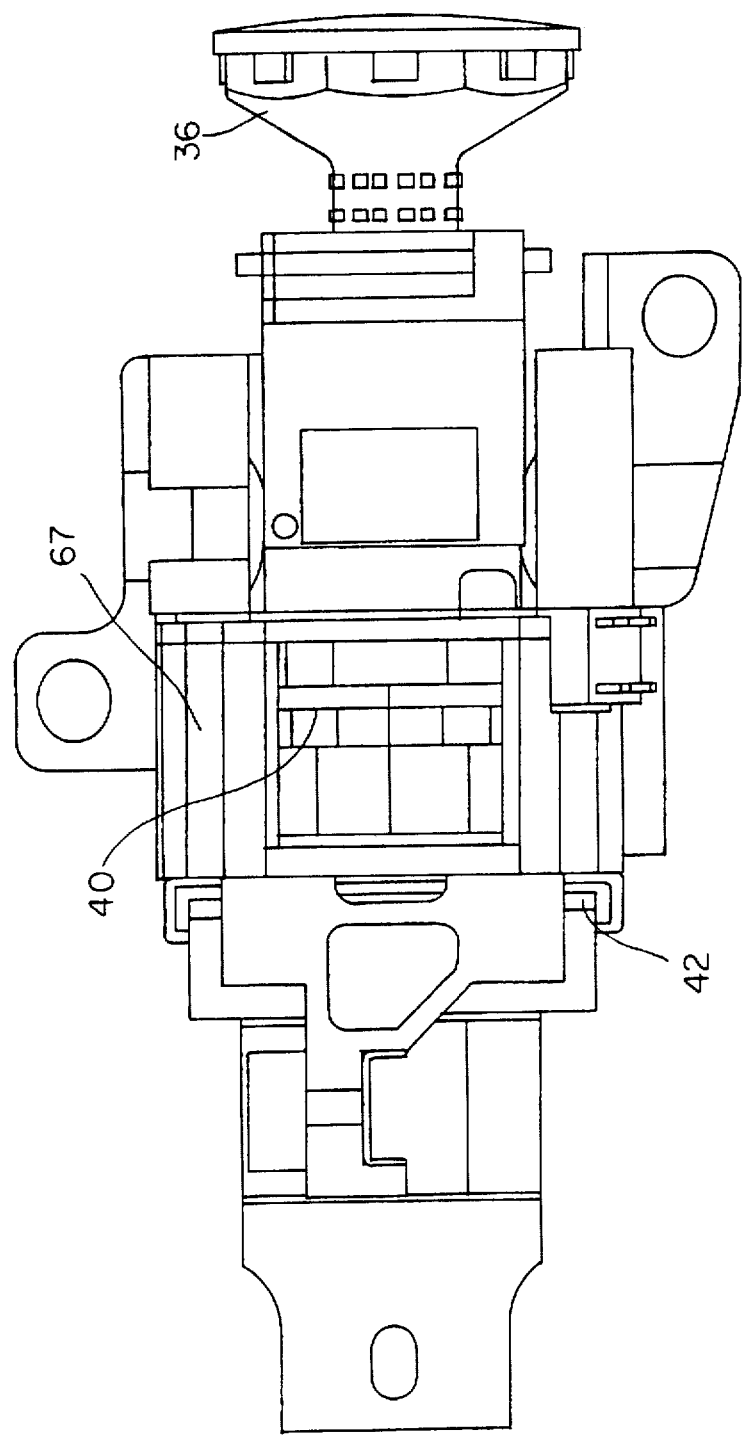
FIG. 14c is a top view of the read/write assembly according to the present invention.

The preferred inside-out spin motor 40 will now be described with reference to FIGS. 14a and 15. Spin motor 40 is preferably a twelve slot, eight pole motor, having an inside-out motor design generally comprised of stator windings 62 mounted on a stationary lamination (not shown). The lamination and stator windings 62 are preferably surrounded by the rotor, which is comprised of an annular magnet structure 64. Magnet structure 64 may be formed from conventional magnetic materials such as Samarium Cobalt or Neodymium and may include a plurality of north-south pole pairs forming the rotor pieces for the motor. A disk section 66 located toward a rear end of the shaft 52 has a larger radius than the rest of shaft 52, and magnet structure 64 may preferably be attached to the outer radius of disk 66 on the face of disk 66 facing the rear section of read/write assembly 32. Thus, as is known in the art, commutation of an electrical current through windings 62 will cause the magnet structure 64 to rotate, thereby rotating shaft 52.

The lamination 63 and stator windings 62 may preferably be fixedly mounted to an interior rear surface of a spin motor cap 67, which spin motor cap 67 is fixedly attached to the bearing housing 54 in the rear section of read/write assembly 32. Fixedly mounted to bearing housing 54, spin motor cap 67 pivots about tilt axis 60 with the other components of the pivoting assembly, but does not rotate. Disk section 66 with magnet structure 64 is received in the spin motor cap 67 juxtaposed to the stator windings 62. The inside-out spin motor design allows the laminations to be fixedly mounted to the interior rear surface of the spin motor cap 67. The spin motor cap 67 in turn allows the voice coil motor coil to be advantageously located in the rear of the pivoting assembly, as will be explained in greater detail below. In a preferred embodiment, spin motor cap may be constructed out of aluminum. However, it is also contemplated that the cap 67 be constructed out of a conventional low carbon steel to reduce the amount of the magnetic flux from the spin motor 40 which penetrates through the cap.

The present invention may alternatively operate without the spin motor cap 67. In the embodiment shown in FIG. 16, the shaft 52 may be lengthened and spin motor 40 may be provided forward of the larger radius disk section 66 of shaft 52. The lamination and windings 62 may be fixedly attached to the bearing housing 54, allowing the lamination and windings 62 to pivot with the bearing housing 54 but not to rotate. Magnet structure 64 surrounds the lamination and windings 62 by being mounted to the outer radius of disk 66 on the face of disk 66 facing the forward section of read/write assembly 32.

Figure 15:
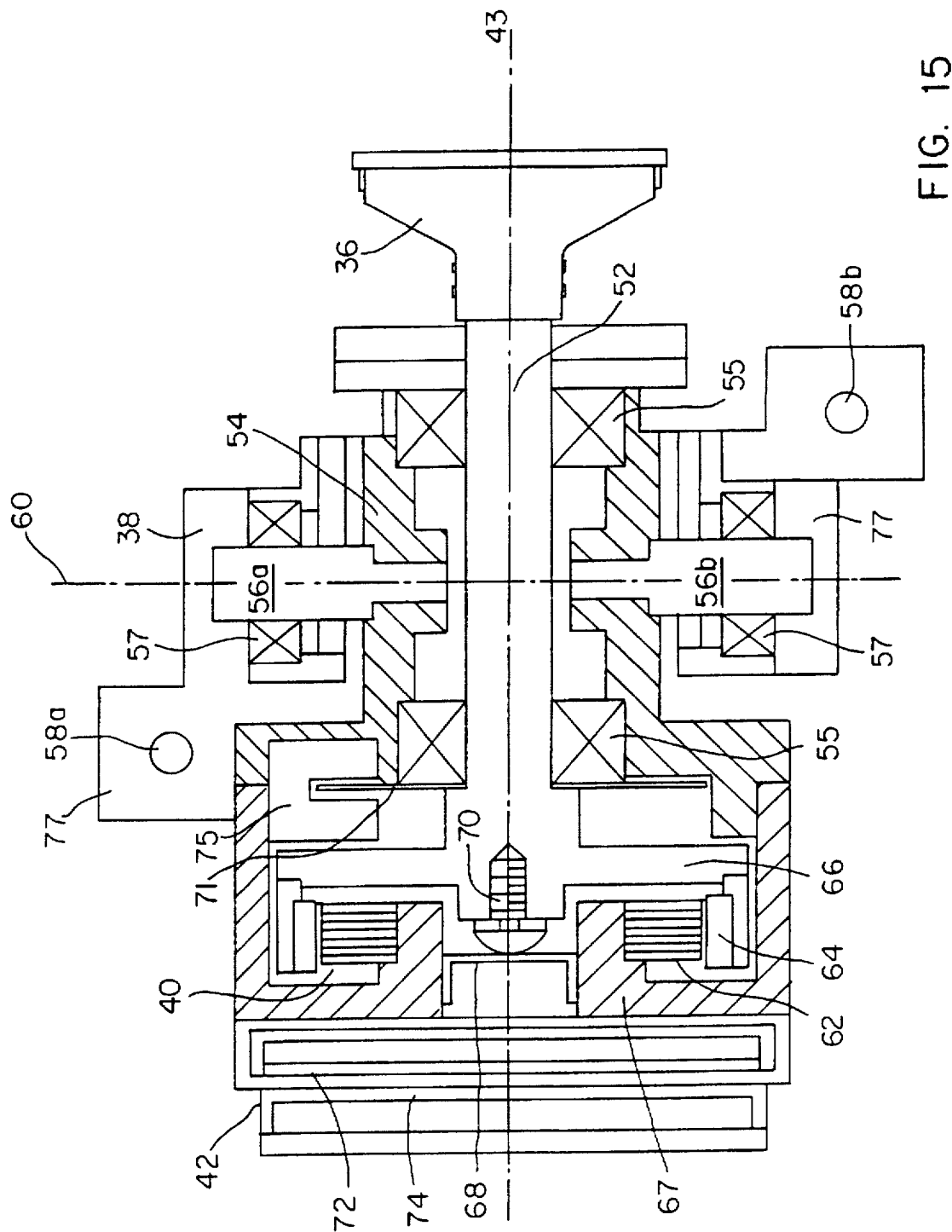
FIG. 15 is a cross-sectional view of the read/write assembly through line 15—15 in FIG. 14b.
Figure 17:
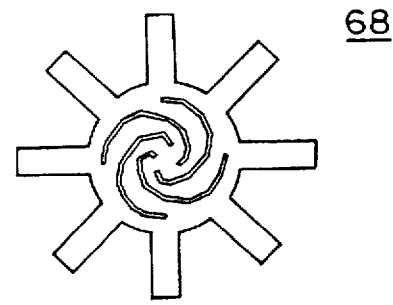
FIG. 17 is a front view of the leaf spring shown in FIG. 15.

As shown in FIGS. 15 and 17, the preferred inside-out spin motor 40 may additionally include a leaf spring 68 in physical contact with a conductor 70 attached to shaft 52. Conductor 70 is formed from an electrical conductor such as, for example, graphite. As the rotor of the spin motor 40 rotates, static electricity may build up in the motor which interferes with the operation and control of the motor or induces errors while reading or writing data to/from the tape. Thus, leaf spring 68, which is electrically grounded through leads (not shown) to frame 22, is provided to allow discharge of the static electricity. Conductor 70 may preferably have a threaded section received in a threaded bore in the rear end face of shaft 52 to secure conductor 70 to shaft 52.

Figure 18A:
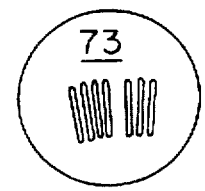
FIG. 18A is an exploded view of FIG. 18.
Figure 18:
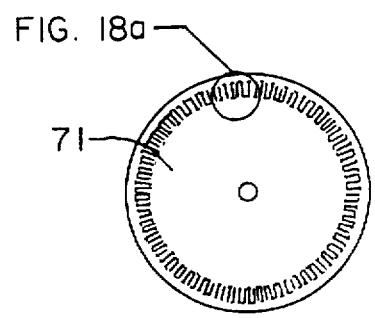
FIG. 18 is a front view of the encoder disk shown in FIG. 15.

It is important that the spin motor be controlled to rotate at a very constant speed so that the data tracks are uniformly spaced on the data tape. Therefore, spin motor 40 may further include an encoder disk 71 for providing the rotational position of the head assembly and for determination of the rotational speed of spin motor 40. Encoder disk 71 is substantially flat and, as shown in FIG. 18, includes a plurality of finely cut slots around an outer radius, each slot having a width of approximately 0.003 inches. The slots extend around the entire periphery of disk 71 and are evenly spaced except at a location 73, where no slot is formed. The outer radius of encoder disk 71, including the slots, is received in an optical sensor 75 stationarily mounted on bearing housing 54.

The encoder disk 71 rotates with spin motor 40 and the head assembly 36, and each time the location 73 passes through the optical sensor 75, a signal is generated and forwarded to electronic control circuitry on the PCB 34. With this information, the PCB 34 can identify the rotational position of the core elements on the head assembly 36 relative to the data tape 44.

Additionally, the optical sensor 75 generates and forwards to PCB 34 another signal for the passage of each slot as a result of optical sensor 75, sensing light passing through each slot. Thus, the rotational speed for one revolution or a portion of one revolution may be identified by PCB 34. The actual rotational speed of the spin motor 40 as determined by the encoder disk 71 and the optical sensor 75 are referenced against the quartz crystal oscillator in PCB 34 for both read and write cycles to provide a closed loop servoing system. This system ensures that the spin motor rotates at a constant rotational speed and, together with the capstan motor servo system, ensures that the data tracks are evenly spaced when written and that the heads align with the data tracks when read.

The primary difficulty in providing an arcuate scan tape drive for storing up to 10 gigabytes of data on a conventional minicartridge is that the servoing scheme and the servo structures must be able to quickly and accurately align the core elements 46 on the arcuate data tracks. As shown in the embodiment of FIGS. 14 and 15, voice coil motor 42 may preferably be located adjacent the spin motor cap 67 in the rear section of the read/write assembly 32. As stated in the Background of the Invention, it is extremely important that the alignment of the core elements 46 with the arcuate data tracks on data tape 44 not be disturbed by vertical movement of data tape 44 transverse to the longitudinal direction of the advancement of the tape. Thus, the present invention discloses a novel design for a voice coil motor 42 for frequent and accurate adjustment of the pivoting assembly so as to align the rotational axis 43 with the prerecorded centerline of the data tape 44 during a write cycle and with the centerline of the recorded data tracks during a read cycle.

The voice coil motor 42 may preferably include a single coil of windings 72 mounted to the rear face of spin motor cap 67 and a magnet 74 stationarily mounted to a post extending from the frame 22. By providing the voice coil motor at the rear most section of the drive, where it is farthest away from the tilt axis 60, a relatively small force is sufficient to quickly pivot the pivoting assembly to a properly adjusted position. Winding 72 is oriented with respect to magnet 74 as shown such that, upon commutation of a current through winding 72, winding 72 is repelled in either an upward or downward direction, depending on the direction of current through the winding 72. As will be described hereinafter, the intensity and direction of electrical current through winding 72 are adjusted in response to either servo signals from read elements 46a during a read or a stored centerline value during a write, and feed back signals from bicell assembly 76. These signals control the positioning of winding 72 with respect to magnet 74 and thus the positioning of rotational axis 43 with respect to the data tape 44.

Figure 16:
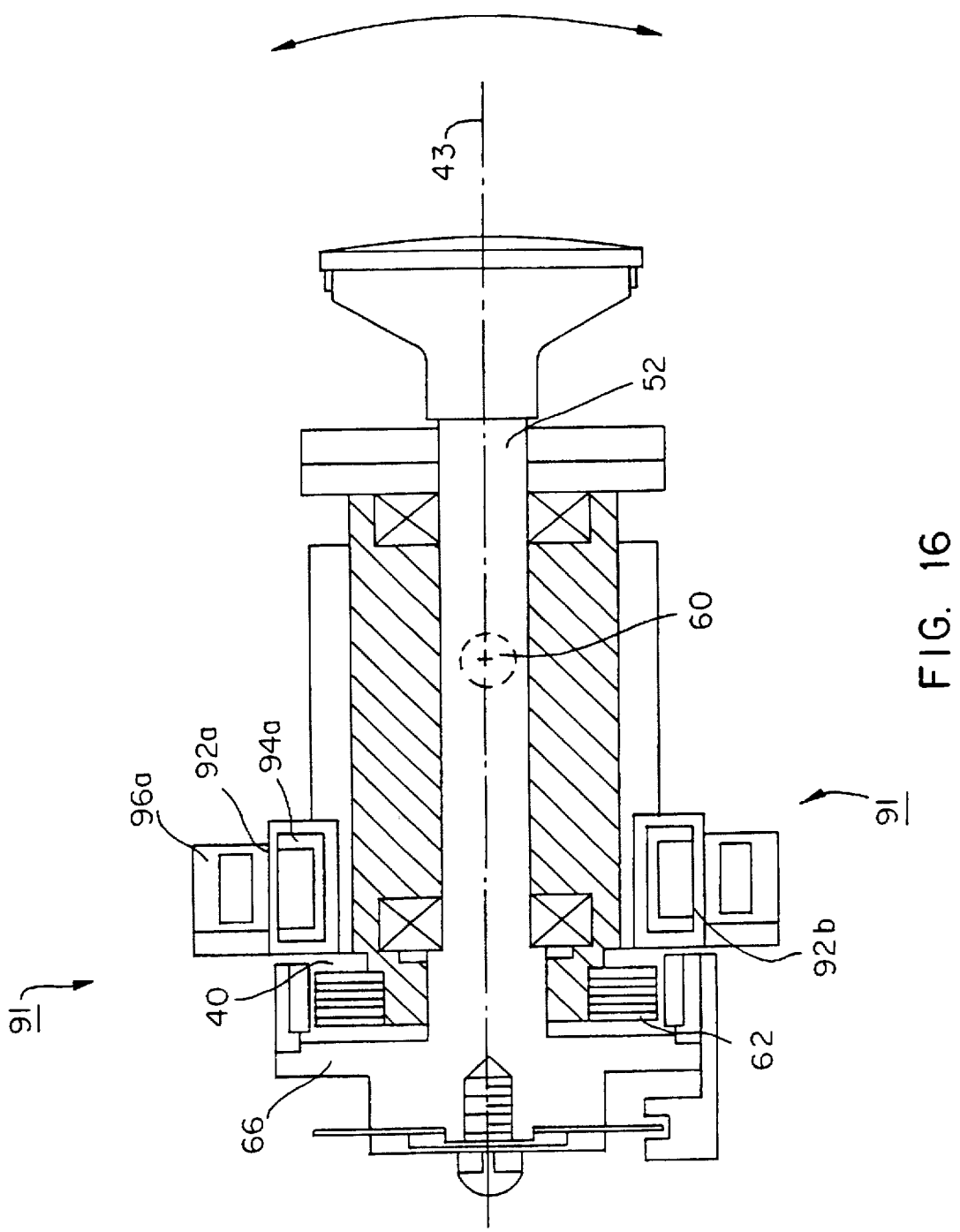
FIG. 16 is a cross-sectional side view of an alternative embodiment of the read/write assembly according to the present invention.

The alternative embodiment of the present invention shown in FIG. 16 includes a tilt motor structure 91 comprised of voice coil motors 92a and 92b provided adjacent to and on either side of bearing housing 54, rearward of the tilt axis 60. Voice coil motor 92a includes winding 94a mounted to bearing housing 54 and magnet 96a fixedly mounted on a post extending from frame 22. As described above, winding 94a is oriented with respect to magnet 96a such that, upon commutation of a current through winding 94a, winding 94a is repelled to a degree in either an upward or downward direction depending on the direction and intensity of current through the winding 94a. The voice coil motor 92b is of identical construction and is the mirror image of voice coil motor 92a described above. The physical characteristics of, and current through, voice coil motor 92a should be substantially the same as the physical characteristics of, and current through, voice coil motor 92b. A difference in properties or relative currents would cause one of the motors to exert a greater repulsive force than the other, thereby creating a rotational torque urging the pivoting assembly to rotate about the tilt axis 60. Together, voice coil motors 92a and 92b act to pivot the pivoting assembly so as to properly align rotational axis 43 with the data tape 44. As compared to the voice coil motor 42 shown in FIGS. 14 and 15, tilt motor structure 91 must generate a greater force to pivot the pivoting assembly. This is true because the tilt motor structure 91 is located closer to tilt axis 60.

Due to the high frequency of servoing signals forwarded to voice coil motor 42, the tilt angle of pivoting assembly is constantly being adjusted to properly align the rotational axis 43 with the relatively slow moving data tape 44. Relative to the full range of motion of the pivoting assembly, the amount that voice coil motor 42 pivots the pivoting assembly in response to a servo signal is very slight prior to receipt of the next subsequent servo signal.

Figure 19:
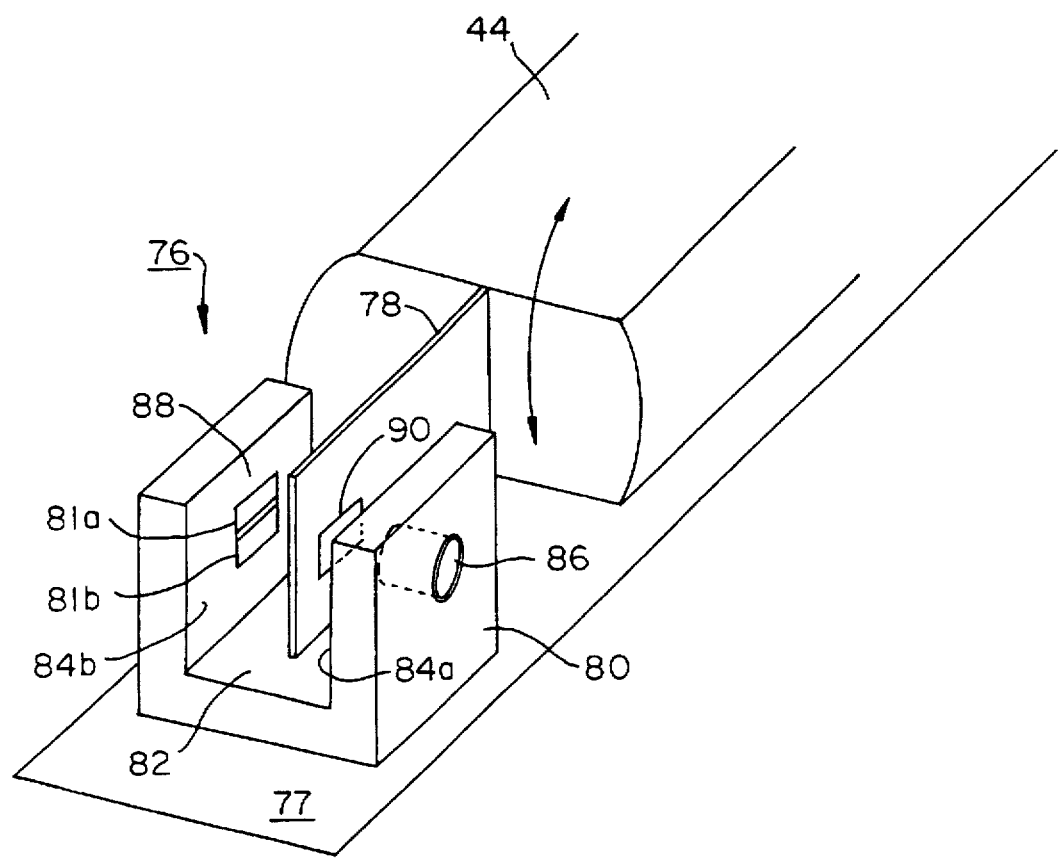
FIG. 19 is a perspective view of the bicell assembly according to the present invention.

As shown in FIG. 19, the present invention may further include a bicell assembly 76 to sense the tilt angle of rotational axis 43. Bicell assembly 76 includes tongue 78 and bicell 80. Tongue 78 is mounted to the rear face of spin motor cap 67 so as to pivot with spin motor cap 67. Bicell 80 is mounted on top of the read/write assembly base 77 and includes a gap 82 for receiving tongue 78, which gap is defined by gap faces 84a and 84b. Gap face 84a may preferably include a light source 86 emitting a light beam across gap 82 which illuminates with a sensor 88 provided in opposite gap face 84b. Sensor 88 includes diodes 81a and 81b, with diode 81a provided above diode 81b. Tongue 78 is provided with a hole 90 through which the light beam passes.

When the rotational axis 43 is aligned with the horizontal, hole 90 is positioned in gap 82 such that diodes 81a and 81b register equal amounts of light incident thereon. However, if, for example, the rotational axis 43 is below the horizontal at the front face of the drive, hole 90 will be positioned in gap 82 such that diode 81a will register a greater amount of light incident thereon than diode 81b. The greater the tilt angle is, the greater will be the difference between the amount of light registering on diode 81a relative to diode 81b. Diodes 81a and 81b are preferably conventional phototransistors which generate a voltage based on the amount of light incident thereon. The voltages generated from diodes 81a and 81b are amplified and compared. A signal representing which diode is registering more light, and the degree to which it is greater, is forwarded to PCB 34. This signal represents the actual tilt angle of the pivoting assembly.

In order to correct the tilt angle, the actual tilt angle from the bicell assembly 76 is compared against an expected tilt angle in a closed loop servoing scheme. The actual tilt angle is corrected by the voice coil motor 42 until the difference between the actual tilt angle and the expected tilt angle is reduced to zero. This process occurs frequently with the actual tilt angle always being adjusted to match the expected tilt angle. The expected tilt angle is identified differently for a write cycle than a read cycle as explained below.

For determination of the expected tilt angle during a write cycle, when the cassette 26 is first inserted into drive 20, the tape 44 is wound to either the beginning or end of the tape. Minicartridges made for this application are made with a prerecorded centerline written by the tape manufacturer at the beginning and end of the tape. The rotational axis 43 is then aligned with this prerecorded centerline. Once aligned, the tilt angle signal determined in bicell assembly 76 is obtained as explained above and stored in a temporary memory. This value is the expected tilt angle for the entire write cycle. During the write cycle, the actual tilt angle is compared against this value and the tilt motor structure will adjust the pivoting assembly until the difference between the expected and actual is zero. Since the expected tilt angle in a write cycle is a known constant value, the actual tilt angle should always be the same as the expected. However, imbalance in the mass of the pivoting assembly or external vibration and shock can effect the actual tilt angle. Therefore, the bicell assembly and control circuitry are active during a write cycle to frequently determine and, if necessary, correct the actual tilt angle.

With the above feature, the data tracks written on the data tape 44 align with the prerecorded centerline at the beginning or end of the tape, without regard for the instantaneous vertical position of the data tape. As previously stated, the data tape may move up or down a slight distance as it travels past the recording area. However, a data tape may not move up or down so much that a written data track starts or ends beyond the useable recording width of the data tape.

For determination of the expected tilt angle during a read cycle, servo signals are generated in read elements 46a, as explained below, from which the centerline of the data track may be determined. This value is used as the expected tilt angle against which the actual tilt angle is compared. In a read cycle, the expected tilt angle will vary and the bicell assembly and control circuitry are used to frequently determine and correct the actual tilt angle to match the expected tilt angle.

In a preferred embodiment of the present invention, the spin motor rotor is first assembled on shaft 52. The shaft is next passed through the spin axis bearings 55 in the bearing housing. Thereafter, the head drum 180 is assembled and provided on shaft 52. Once both components are securely positioned on shaft 52, the core elements 46 are affixed to the drum and laser trimmed so as to be located at a precise radial distance from the center of the rotating drum 180. Then the faceplate is affixed. This method of construction provides the easiest method of forming the read/write assembly with precisely positioned core elements. It is, however, understood that the components of the drive may be assembled into the whole in various combinations and that the core elements may be laser trimmed prior to placement of the head drum 180 on shaft 52.

The Flex Circuit

Figure 20:
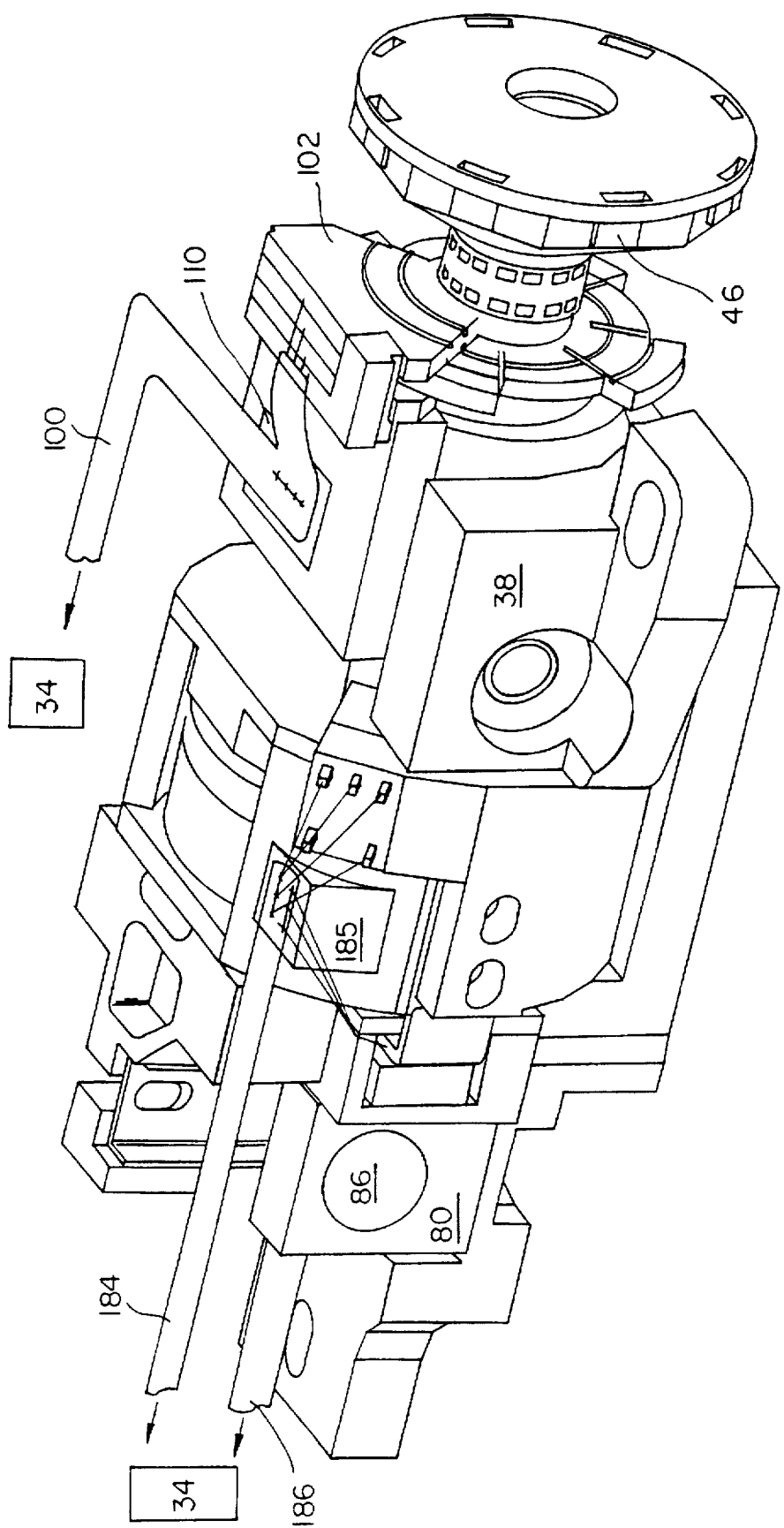
FIG. 20 is a perspective view of the read/write assembly of the present invention including the flex circuits.

As shown in FIG. 20, the present invention may include three separate flex circuits. A data flex circuit 100 is provided to transfer data signals between PCB 34 and a read/write amplifier 110, and between amplifier 110 and a transformer assembly 102. The transformer assembly in turn transfers data signals to and from the core elements 46. The present invention employs a novel transformer assembly 102, which assembly is described and claimed in U.S. Pat. No. 5,455,729, owned by assignee of the present invention, and is expressly incorporated by reference herein. It is understood, however, that transformer 102 may be provided in various known physical configurations in the present invention to accomplish the transfer of the electrical data signals between data flex circuit 100 and the appropriate read or write core element 46.

As shown in FIG. 20, the read/write amplifier 110 is mounted on an upper flat surface 54a of bearing housing 54. Data flex circuit 100 is mounted at one end to terminals for wires on the stationary portion of the transformer 102. From the stationary portion of transformer 102, the flex circuit 100 connects to the read/write amplifier on surface 54a. It is advantageous to provide read/write amplifier 110 in a close physical relation to the transformer 102. From the surface 54a, the flex circuit is electrically connected to the PCB 34. An S-shaped curve is provided in the flex circuit 100 between the PCB 34 and the amplifier 110 to increase flexibility and to minimize the torque exerted by flex circuit 100 on the pivoting assembly, thereby minimizing any interference with the pivoting assembly by the voice coil motor 42.

In order to avoid possible distortion due to noise, it is desirable to isolate the data signals to and from core elements 46 from the signals and power to the spin motor 40 and the voice coil motor 42. Therefore, the present invention includes spin motor/voice coil flex circuit 184 which is separate from data flex circuit 100. Spin motor/voice coil flex circuit 184 is provided to transfer power signals from the PCB 34 to the spin motor 40, the encoder sensor 75 and the voice coil motor 42. The flex circuit 184 further transfers feedback signals from the encoder sensor 75 to the PCB 34.

The flex circuit 184 preferably runs from a section of the PCB 34 on the top side of frame 22 to a shelf 185 mounted adjacent to the encoder sensor 75. From there, the flex circuit splits to transfer power and signals to the spin motor 40 and power to voice coil 42. In an alternative embodiment, the power and feedback signals in the spin motor/voice coil flex circuit 184 may be subdivided to isolate the power signals from the feedback signals, thereby avoiding any possible noise interference in the feedback signals.

A third flex circuit, the bicell flex circuit 186, is provided to supply power to the bicell assembly light source 86 and to transfer signals from the diodes 81a and 81b to the PCB 34.

Core Element Alignment Servoing Scheme

As alignment of the core elements 46 with the arcuate data tracks 118 on tape 44 is extremely important, the present invention includes several servo mechanisms and signals to frequently monitor the position of the core elements 46 with respect to a data track 118 being written or played back. As previously explained, during a write cycle, the position of the write element 46b with respect to the data tape 44 is determined by a quartz crystal oscillator on the PCB 34 and a prerecorded centerline at the beginning and end of the tape. The quartz crystal determines the speed of the advancing tape and the rotational speed of the spin motor, and the prerecorded centerline determines the head assembly tilt angle at which the data tracks are recorded.

However, in order to allow a data tape written in one tape drive to be played back in another, the position of the core elements 46 with respect to the data tracks 118 during a read cycle is determined by servo signals generated from the tape in read element 46a. Namely, if data tape 44 is advancing too quickly or slowly such that the elements 46 are in front of or behind the data track 118, the speed of the advancing tape is decreased or increased by correcting the speed of the capstan motor 124. Similarly, if the data tape is misaligned in the transverse or vertical direction, the tilt angle of the pivoting assembly is corrected by adjusting the position of the winding 72 in voice coil motor 42.

Figure 21:
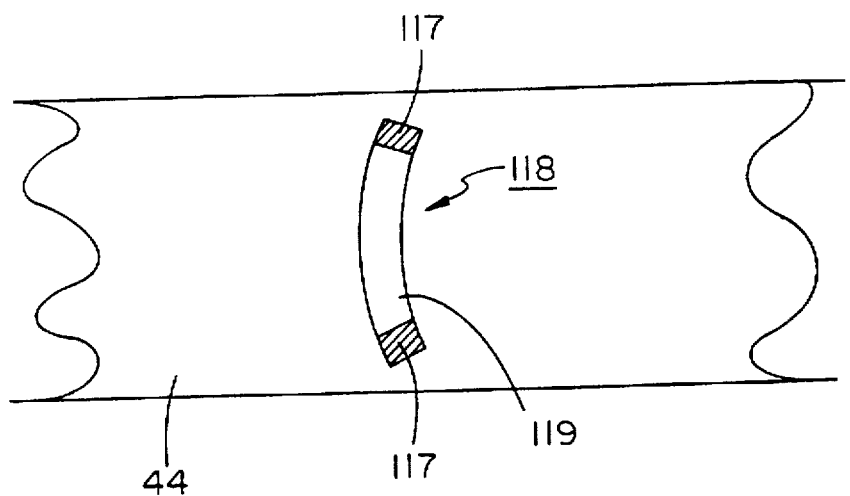
FIG. 21 is an enlarged view of a data track showing servo bursts at the top and bottom of the track.

Various known servo techniques may be utilized for generating servo signals in read elements 46a, which servo signals may be used to adjust the rotational speed of the spin motor, the speed of the advancing tape and/or the tilt angle of the pivoting assembly. As taught in U.S. application Ser. No. 07/898,926, to Lemke, rights to which are partly owned by assignee of the present invention and which Application is expressly incorporated by reference herein, one technique for generating servo signals is to include servo bursts 117 at the beginning (top) and end (bottom) of a data track 118 above and below the data 119 (FIG. 21). The servo bursts of adjacent tracks are of differing frequencies. Thus, when read element 46a is properly aligned on data track 118, the frequency of the servo burst at the top and bottom of the track as sensed by read element 46a will be the same. However, if the tilt angle or head assembly rotational speed is such that the arcuate path traced by the read element 46a across tape 44 is not properly aligned with a data track 118 during a scan, a sampling of the servo burst at the beginning of the scan will be different than the sampling of the servo burst at the end of the scan, thus indicating a misalignment. The degree to which the servo bursts at the top and bottom of the track are dissimilar will indicate how much correction is needed. Moreover, a sampling of the servo bursts at the top and bottom of the track allow identification of the centerline of the data track, which is then used for identification of the expected tilt angle as explained above. Thus the actual rotational speed of the spin motor and/or the actual tilt angle of the pivoting assembly, which are determined by the encoder disk and bicell assembly respectively, may be adjusted.

Alternatively, servo signals may be generated using the data track address. Each data track 118 has a unique track address identifying that particular track location. As is known in the art, the least significant bits of the track address of each data track 118 may be sampled to generate servo signals in read elements 46a to adjust the tilt angle of the pivoting assembly and/or the rotational speed of the spin motor.

Although the invention has been described in detail herein, it should be understood that the invention is not limited to the embodiments herein disclosed. Various changes, substitutions and modifications may be made thereto by those skilled in the art without departing from the spirit or scope of the invention as described and defined by the appended claims.

We claim:

1. A method of assembling a rotating head assembly of a tape drive, the tape drive comprising:

a base;

a cover mating with said base;

a rotating head assembly, having a rotational axis, for transferring data to and from a plurality of arcuately-shaped data tracks on a data tape advancing in a longitudinal direction, said rotating head assembly capable of recording up to ten gigabytes of data on said data tape, said rotating head assembly including:

a rotating head drum at a forward end of said rotating head assembly, a plurality of core elements affixed to said rotating head drum and proximate to said data tape for transmitting and receiving data signals, an inside-out spin motor for causing rotation of said rotating head assembly, said inside-out spin motor including a rotating magnet surrounding a plurality of stationary coils of electrically conductive windings;

support means for supporting said rotating head assembly, said support means including rotating means for allowing said rotating head assembly to rotate and pivot means for allowing said rotational axis to pivot in a plane perpendicular to said longitudinal direction, and a voice coil motor provided at a second end opposite said forward end for pivoting said rotating head assembly; and control means for providing information to and receiving information from said plurality of core elements and providing control signals to said inside-out spin motor and said voice coil motor wherein the method of assembling the rotating head assembly comprises the steps of:

assembling said inside-out spin motor on a shaft;
assembling said rotating head drum on said shaft;
providing said plurality of core elements on said rotating head drum after said inside-out spin motor and said rotating head drum have been assembled on said shaft; and
laser etching a head gap on each core element of said plurality of core elements at a precise radial distance from said rotational axis after said plurality of core elements have been provided on said front section.

2. A method of assembling a rotating head assembly of an arcuate scan tape drive for transferring data to and from a data tape, the arcuate scan tape drive comprising:

a base;

a rotating head assembly mounted within said base having an axis of rotation aligning with a centerline of the data tape, said axis of rotation intersecting the data tape at an oblique angle, said rotating head assembly including:

a front section having a front surface juxtaposed to the data tape, said front surface having a conical shape, and a plurality of core elements provided on said front surface such that, during one rotation of said rotating head assembly, a core element of said plurality of core elements traverses the data tape in a first pass wherein data is transferred to or from the data tape and said core element traverses the data tape in a second pass wherein data is not transferred to or from the data tape, said data tape being in close proximity to said core element in said first pass and said data tape being spaced away from said core element in said second pass;

an inside-out spin motor for causing rotation of said head assembly including:

an annular lamination stationarily mounted with respect to said rotating head assembly, said lamination having a plurality of radially extending arms, a coil of electrically conductive windings mounted on each arm of said plurality of arms, and a rotating annular magnet concentric with said lamination and radially surrounding said electrically conductive windings;

wherein the method of assembling the rotating head assembly comprises the steps of:

assembling said inside-out spin motor on a shaft;
assembling said front section on said shaft;
providing said plurality of core elements on said front section after said inside-out spin motor and said front section have been assembled on said shaft; and
laser etching a head gap on each core element of said plurality of core elements at a precise radial distance from said rotational axis after said plurality of core elements have been provided on said front section.

3. A method of assembling a rotating head assembly of a tape drive, the rotating head assembly including a rotating head drum, a plurality of core elements affixed to the rotating head drum, and an inside-out spin motor for causing rotation of the rotating head assembly, the method comprising the steps of:

assembling said inside-out spin motor on a shaft;
assembling said rotating head drum on said shaft;
providing said plurality of core elements on said rotating head drum after said inside-out spin motor and said rotating head drum have been assembled on said shaft; and
laser etching a head gap on each core element of said plurality of core elements at a precise radial distance from a rotational axis of the rotating head assembly after said plurality of core elements have been provided on said rotating head drum.

4. A method of assembling a rotating head assembly to be placed into an arcuate scan tape drive head assembly to be mounted within a base of an arcuate scan tape drive to have an axis of rotation aligning with a centerline of a data tape and intersecting the data tape at an oblique angle, the rotating head assembly having a front section with a front surface juxtaposed to the data tape, said front surface having a conical shape, and a plurality of core elements provided on the front surface such that, during one rotation of the rotating head assembly, a core element of the plurality of core elements traverses the data tape in the first pass when data is transferred to or from the data tape and the core element traverses the data tape in a second pass when the data is not transferred to or from the data tape, said data tape being in close proximity to the core element in the first pass and the data tape being spaced away from the core element in the second pass, and further comprising a spin motor cap stationarily mounted with respect to the head assembly at a rear end opposite the front surface for covering the inside-out spin motor, the annular laminations and conductive windings stationarily mounted to an interior surface of the spin motor cap, the method comprising the steps of:

assembling the inside-out spin motor on a shaft;

assembling the front section on the shaft;

providing the plurality of core elements on the front section after the inside-out spin motor and the front section have been assembled on the shaft; and laser etching a head gap on each core element of the plurality of core elements at a precise radially distance from the rotational axis after the plurality of core elements have been provided on the front section.

* * * * *